(12) United States Patent
Aoyama

(10) Patent No.: US 8,466,587 B2
(45) Date of Patent: Jun. 18, 2013

(54) LINEAR MOTOR

(75) Inventor: Yasuaki Aoyama, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 263 days.

(21) Appl. No.: 13/079,084

(22) Filed: Apr. 4, 2011

(65) Prior Publication Data

US 2011/0248579 A1   Oct. 13, 2011

(30) Foreign Application Priority Data

Apr. 7, 2010   (JP) .................................. 2010-088252

(51) Int. Cl.
*H02K 41/02* (2006.01)

(52) U.S. Cl.
USPC ..................................... 310/12.25; 310/12.24

(58) Field of Classification Search
USPC ............................................ 310/12.22–12.26
See application file for complete search history.

(56) References Cited

U.S. PATENT DOCUMENTS

| | | | |
|---|---|---|---|
| 4,254,350 A * | 3/1981 | Miroshnichenko et al. | 310/13 |
| 5,661,350 A * | 8/1997 | Lucidarme et al. | 310/12.28 |
| 6,066,998 A * | 5/2000 | Trumper et al. | 335/229 |
| 2002/0043879 A1 * | 4/2002 | Joong et al. | 310/12 |
| 2002/0050743 A1 * | 5/2002 | Okada et al. | 310/12 |
| 2002/0053835 A1 * | 5/2002 | Joong et al. | 310/12 |
| 2004/0178684 A1 * | 9/2004 | Joong et al. | 310/12 |
| 2009/0072675 A1 * | 3/2009 | Kanehara | 310/49 R |
| 2011/0298308 A1 * | 12/2011 | Aoyama et al. | 310/12.15 |

FOREIGN PATENT DOCUMENTS

JP   2001-028875   1/2001

* cited by examiner

*Primary Examiner* — Thanh Lam
(74) *Attorney, Agent, or Firm* — Antonelli, Terry, Stout & Kraus, LLP.

(57) ABSTRACT

A linear motor including magnetic-pole teeth which pinch and hold permanent magnets deployed in a displacer, a plurality of iron cores used for continuously connecting the magnetic-pole teeth, windings wound around the plurality of iron cores in batch, and the displacer in which positive and negative magnetic poles of the permanent magnets are arranged alternately. A plurality of magnetic poles including the magnetic-pole teeth and the iron cores are deployed along a longitudinal direction of the displacer. The windings which are common to the plurality of magnetic poles are deployed on the iron cores. The leakage magnetic flux between the adjacent magnetic poles is reduced by making polarities of the plurality of deployed magnetic poles one and the same polarity.

10 Claims, 30 Drawing Sheets

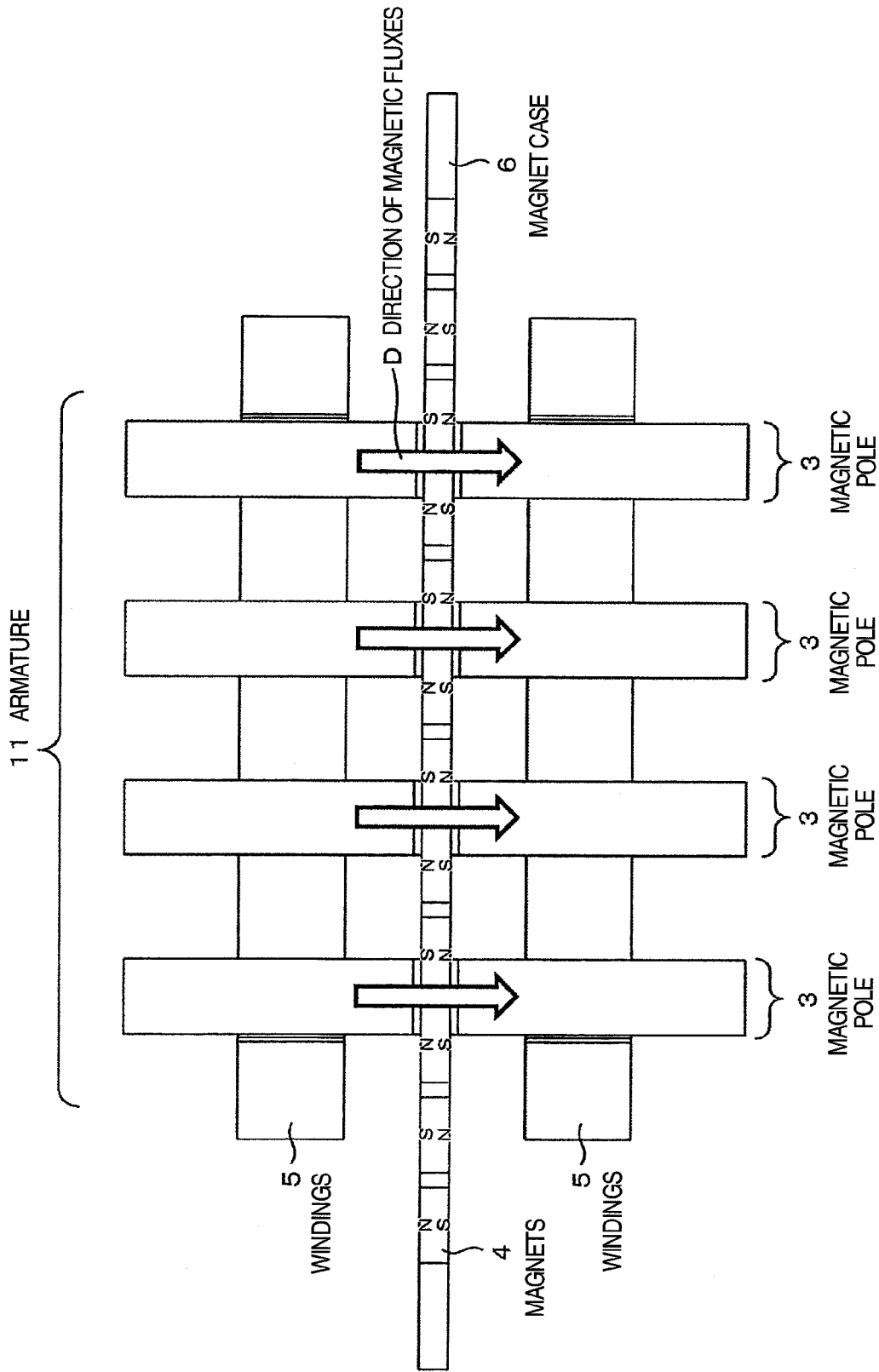

LINEAR MOTOR

BACKGROUND OF THE INVENTION

The present invention relates to a linear motor for generating a thrust.

A linear motor which is equipped with the conventional thrust-generating mechanism has such a profile as being obtained by cutting and opening a rotating motor. Moreover, a large magnetically-attractive force is exerted between its displacer, which is constituted with an array of permanent magnets, and its armature. In JP-A-2001-028875, there is disclosed a linear motor where, in order to cancel out the magnetically-attractive force, magnetic poles having a first polarity and a second polarity are deployed in an alternate manner. In the conventional technology, as illustrated in FIG. 4 of JP-A-2001-028875, adjacent magnetic poles of the magnetic poles arranged in a travelling direction of the displacer have mutually different polarities.

SUMMARY OF THE INVENTION

In the conventional technology, adjacent magnetic-pole teeth of magnetic-pole teeth arranged in the travelling direction of the displacer have the mutually different polarities. As a result of this configuration, there has existed the following drawback: Namely, magnetic flux, which is needed for generating the thrust essentially, intersects the permanent magnets in a chain-like manner. In addition thereto, however, the magnetic flux leaks out to the adjacent magnetic poles. This leakage phenomenon has resulted in the drawback that the thrust becomes lowered.

Furthermore, there has occurred the following undesirable structure: Namely, if the pitch between the magnets in the displacer's travelling direction is tried to be narrowed in order to generate the higher thrust, the above-described leakage magnetic flux increases even further. This phenomenon means that there has occurred the undesirable structure that the thrust becomes lowered even further.

The present invention has been devised in order to solve these problems. Accordingly, an object of the present invention is to reduce the leakage magnetic flux between the adjacent magnetic poles, and thereby to provide the high-thrust linear motor.

In order to accomplish the above-described object, according to an aspect of the present invention, there is provided the following linear motor: A linear motor including an armature, and a displacer, the armature including a plurality of magnetic poles and a plurality of windings, the displacer including a plurality of permanent magnets, the armature and the displacer being relatively displaceable to each other, the magnetic poles further including a plurality of magnetic-pole teeth which are oppositely-deployed on both sides of the permanent magnets with clearances placed therebetween, and a plurality of cores for connecting the magnetic-pole teeth to each other, the magnetic-pole teeth being oppositely-deployed with the clearances placed therebetween, wherein the plurality of magnetic poles are provided in a travelling direction of the displacer, and magnetic fluxes generated by the windings deployed on the armature have one and the same polarity in the plurality of magnetic poles, the plurality of oppositely-deployed magnetic-pole teeth being constituted in a stand-alone manner, distance between the magnetic-pole teeth being variable for each of the oppositely-deployed magnetic-pole teeth.

Also, in order to accomplish the above-described object, according to another aspect of the present invention, there is provided the following linear motor: A linear motor including an armature, and a displacer, the armature including a plurality of magnetic poles and a plurality of windings, the displacer including a plurality of permanent magnets, the armature and the displacer being relatively displaceable to each other, the magnetic poles further including a plurality of magnetic-pole teeth which are oppositely-deployed on both sides of the permanent magnets with clearances placed therebetween, and a plurality of cores for connecting the magnetic-pole teeth to each other, the magnetic-pole teeth being oppositely-deployed with the clearances placed therebetween, wherein the plurality of magnetic poles are provided in a travelling direction of the displacer, and magnetic fluxes generated by the windings deployed on the armature have one and the same polarity in the plurality of magnetic poles, the plurality of oppositely-deployed magnetic-pole teeth being constituted with members which are multilayered in the travelling direction of the displacer.

Also, in order to accomplish the above-described object, according to still another aspect of the present invention, there is provided the following linear motor: A linear motor including an armature, and a displacer, the armature including a plurality of magnetic poles and a plurality of windings, the displacer including a plurality of permanent magnets, the armature and the displacer being relatively displaceable to each other, the magnetic poles further including a plurality of magnetic-pole teeth which are oppositely-deployed on both sides of the permanent magnets with clearances placed therebetween, and a plurality of cores for connecting the magnetic-pole teeth to each other, the magnetic-pole teeth being oppositely-deployed with the clearances placed therebetween, wherein the plurality of magnetic poles are provided in a travelling direction of the displacer, and magnetic fluxes generated by the windings deployed on the armature have one and the same polarity in the plurality of magnetic poles, the magnetic-pole teeth being deployed such that, letting magnet pitch be P, spacing between the magnetic-pole teeth falls into a range of $(2nP \pm P/2)$ with reference to a magnetic-pole tooth which becomes criterion.

Also, in order to accomplish the above-described object, according to an even further aspect of the present invention, there is provided the following linear motor: A linear motor including an armature, and a displacer, the armature including a plurality of magnetic poles and one or a plurality of windings, the displacer including a plurality of permanent magnets, the armature and the displacer being relatively displaceable to each other, the magnetic poles further including a plurality of magnetic-pole teeth which are oppositely-deployed on both sides of the permanent magnets with clearances placed therebetween, and a plurality of cores for connecting the magnetic-pole teeth to each other, the magnetic-pole teeth being oppositely-deployed with the clearances placed therebetween, wherein the plurality of magnetic poles are provided in a travelling direction of the displacer, and magnetic fluxes generated by the one or plurality of windings deployed on the armature have one and the same polarity in the plurality of magnetic poles, distance between the magnetic-pole teeth being variable for each of the oppositely-deployed magnetic-pole teeth, the magnetic fluxes directed in one and the same direction being generated inside the clearances by the one or plurality of windings deployed on the armature.

Moreover, according to an embodiment of the present invention, in the linear motor, the plurality of armatures are deployed in parallel to the travelling direction of the displacer.

Moreover, according to another embodiment of the present invention, in the linear motor, the plurality of displacers are deployed.

Furthermore, according to still another embodiment of the present invention, in the linear motor, the plurality of displacers are connected to each other.

Furthermore, according to an even further embodiment of the present invention, in the linear motor, the plurality of magnetic-pole teeth which are oppositely-deployed to the magnets are provided in parallel to the travelling direction of the displacer, the plurality of displacers being deployed inside the clearances of the respective magnetic-pole teeth, each of the displacers including the permanent magnets.

In addition, according to an even further embodiment of the present invention, in the linear motor, the plurality of displacers deployed inside the clearances of the plurality of magnetic-pole teeth are connected to each other.

In addition, according to an even further embodiment of the present invention, in the linear motor, a supporting mechanism for supporting the displacer is provided among the plurality of armatures.

The linear motor of the present invention is configured as described above. As a result of this configuration, the adjacent magnetic poles have one and the same polarity regardless of whether the value of an electric current flown along the windings is a positive or negative value. As a consequence of the implementation of this condition, the polarities of the magnetic-pole teeth arranged in the travelling direction of the displacer become the one and the same polarity. This condition makes it possible to reduce the leakage of the magnetic flux into the travelling direction of the displacer. Moreover, the leakage magnetic flux is seldom caused to occur even if the magnetic-pole pitch is narrowed. This is because the polarities of the magnetic poles which are adjacent to each other in the travelling direction of the displacer are the one and the same polarity. This condition makes it possible to narrow the magnetic-pole pitch so as to increase the thrust, and to freely adjust the magnetic-pole positions so as to reduce the thrust pulsation.

According to the present invention, it becomes possible to implement the offer of the high-efficiency linear motor where the leakage magnetic flux is reduced.

Also, according to the present invention, it becomes possible to implement the offer of the linear motor where the thrust pulsation is reduced.

Other objects, features and advantages of the invention will become apparent from the following description of the embodiments of the invention taken in conjunction with the accompanying drawings.

BRIEF DESCRIPTION OF THE DRAWINGS

FIG. 12 illustrates a fourth embodiment of the linear motor of the present invention;

DESCRIPTION OF THE INVENTION

Figure 1:
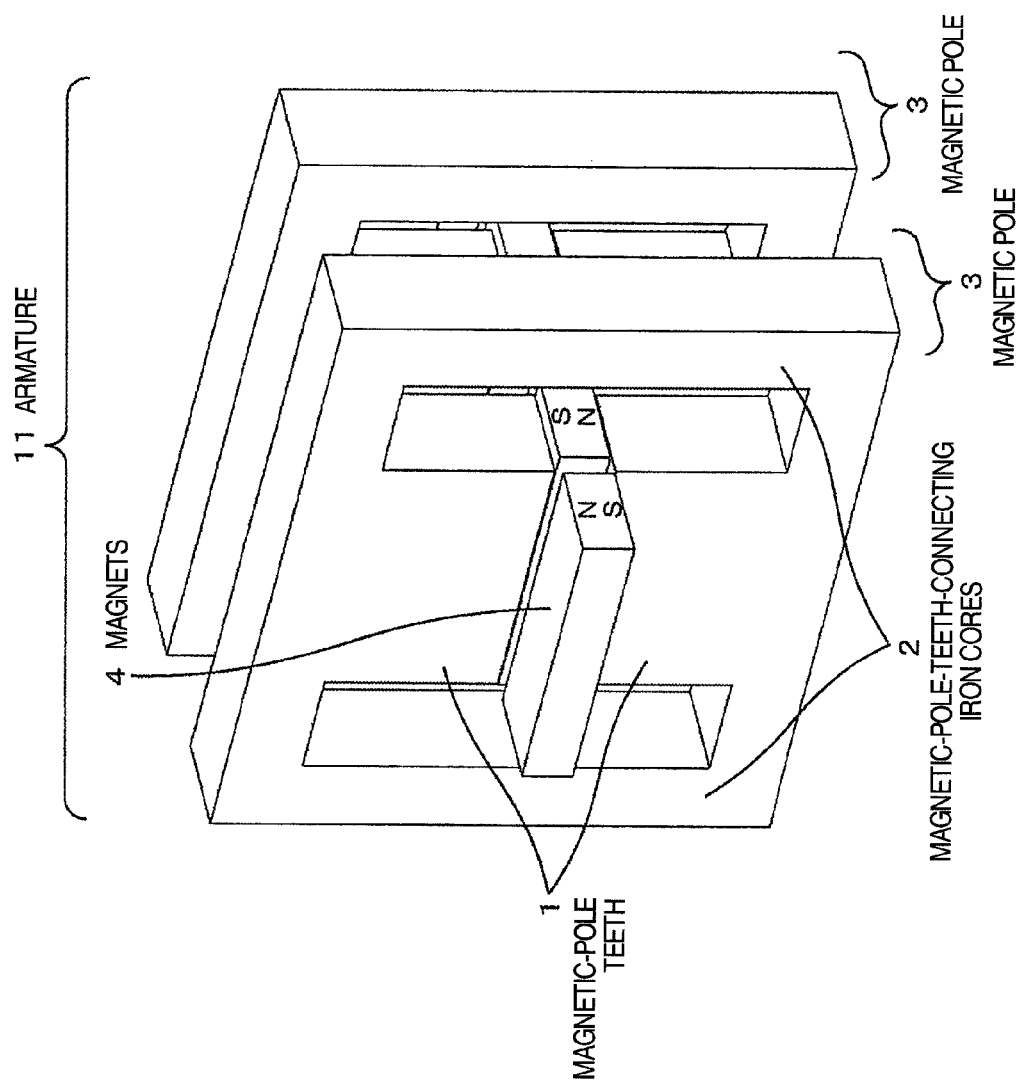
FIG. 1 illustrates a first embodiment of the linear motor of the present invention.

Hereinafter, referring to the drawings, the explanation will be given below concerning an embodiment of the present invention.

1st Embodiment

The description will be given below regarding an embodiment of the present invention. FIG. 1 illustrates the relationship between magnetic poles 3 and permanent magnets 4, both of which constitute an armature 11 of the linear motor according to the embodiment of the present invention. With respect to a magnet array where N poles and S poles of the magnets 4 are arranged in an alternate manner, magnetic-pole teeth 1 are set up over and under the magnets 4 in such a manner that the magnetic-pole teeth 1 sandwich-hold the magnets 4. A magnetic pole 3 is constituted with the upper-side and lower-side magnetic-pole teeth 1 and an iron core 2 for connecting these magnetic-pole teeth 1 to each other. Although, in FIG. 1, a case of the two units of magnetic poles 3 is illustrated, the number of the magnetic poles 3 is not limited thereto.

Figure 2:
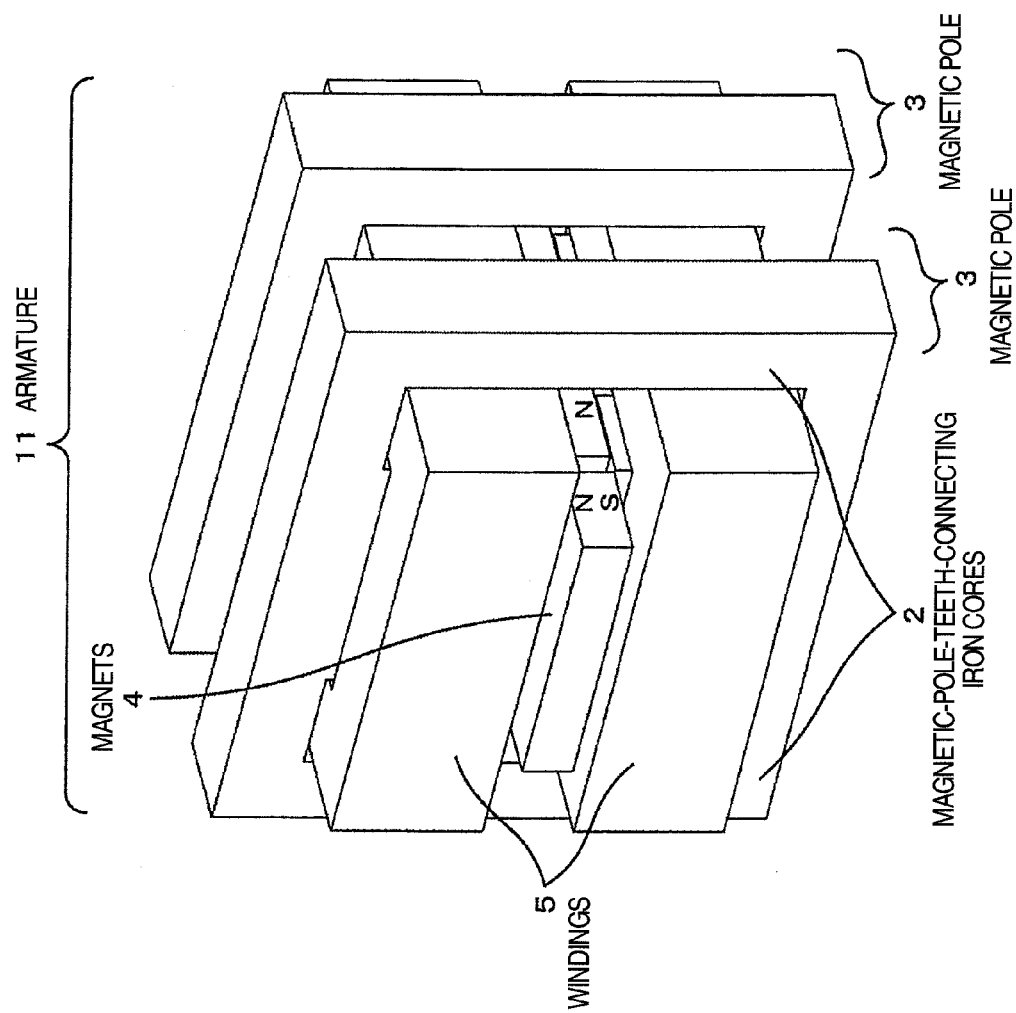
FIG. 2 illustrates the detailed configuration of the first embodiment of the linear motor in FIG. 1.

FIG. 2 is a diagram for illustrating the detailed configuration of the armature 11. Namely, windings 5 are further included, and are combined with the configuration in FIG. 1 for illustrating the relationship between the magnetic poles 3 and the magnets 4. Here, the windings 5, which are common to portions of the magnetic-pole teeth 1 of the plurality of the magnetic poles 3, are deployed on these portions. In the illustration in FIG. 2, the windings 5 are deployed on the upper-side and lower-side magnetic-pole teeth 1, respectively. Even if the number of the magnetic poles 3 increases, the windings 5 can similarly be wound around the portions of the magnetic-pole teeth 1 in common thereto. The single armature 11 is constituted with the plurality of the magnetic poles 3 and windings 5. Moreover, for example, a three-phase-driving linear motor can be configured by arranging the plural units of armatures 11 in accordance with the following manner: Namely, in the case of the three-phase driving, the three units of armatures 11 are set up with the phase difference of 2P/3 set among them. Here, P denotes the pitch between the permanent magnets 4 (i.e., magnet pitch) along the travelling direction of the magnets 4.

Figure 3:
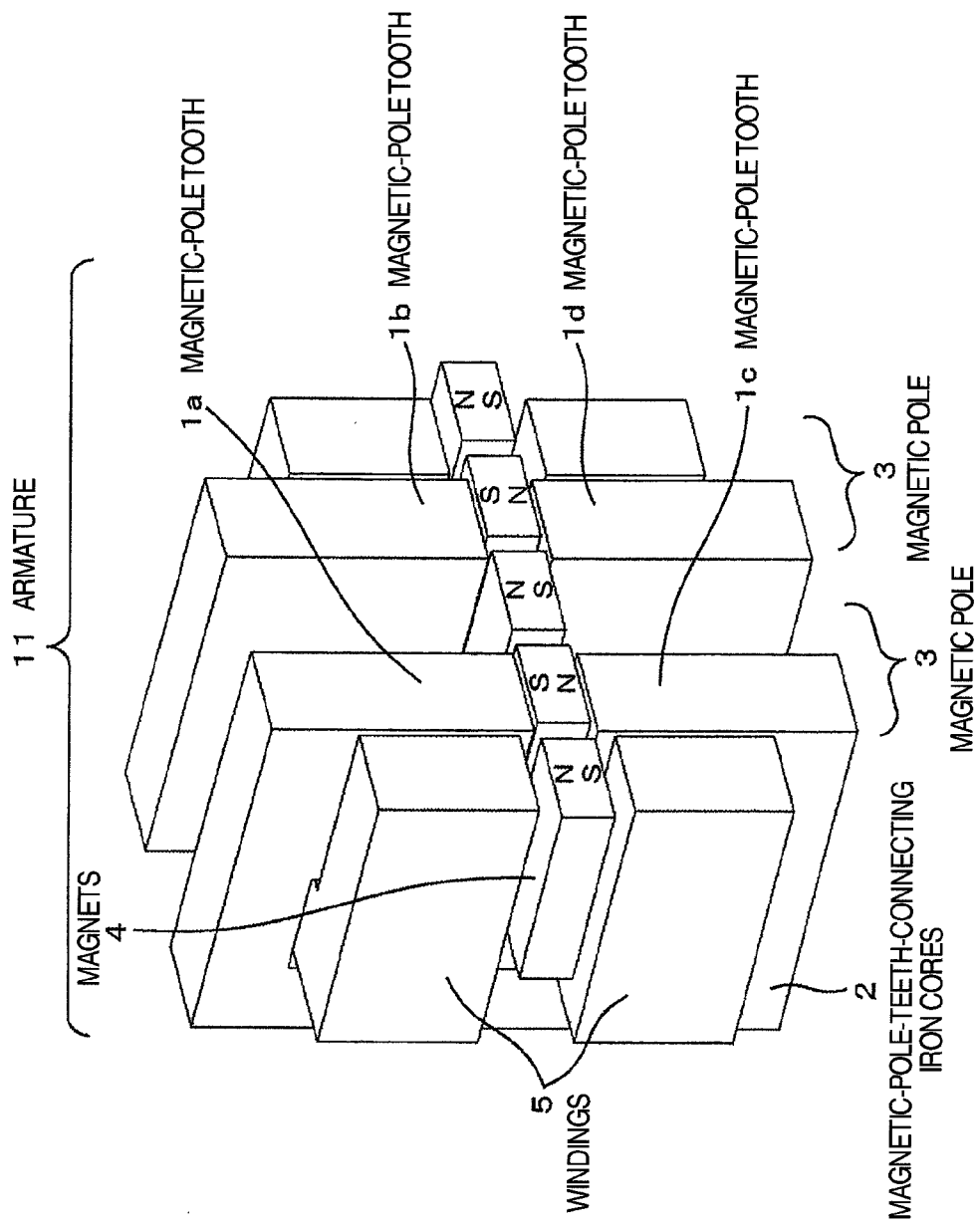
FIG. 3 illustrates a cross-sectional view of the first embodiment of the linear motor.

FIG. 3 is a cross-sectional view of FIG. 2, where the direction in which the magnets 4 are arranged is employed as the criterion for this cross-section. The magnetic-pole teeth $1a$, $1b$, $1c$, and $1d$ are so deployed as to sandwich-hold the magnets 4. Furthermore, the windings 5, which are common to the portions of the magnetic-pole teeth $1a$, $1b$, $1c$, and $1d$, are wound around these portions. Then, flowing an electric current along the windings 5 in each of the magnetic poles 3 gives rise to the generation of magnetism (i.e., magnetic poles) on the magnetic-pole teeth 1. For example, if an N pole is generated on the upper-side magnetic-pole tooth $1a$ as a result of flowing the electric current along the windings 5, an S pole is then generated on the lower-side magnetic-pole tooth $1c$. At this time, the N pole is also generated on the magnetic-pole tooth $1b$ which is adjacent to the upper-side magnetic-pole tooth $1a$, and then the S pole is generated on the lower-side magnetic-pole tooth $1d$. Namely, at this time, the magnetic-pole tooth $1a$ and the magnetic-pole tooth $1b$, which are adjacent to each other, have the same polarity (i.e., the N pole in this case). Accordingly, a leakage magnetic flux between the magnetic-pole tooth $1a$ and the magnetic-pole tooth $1b$ is seldom caused to occur. Consequently, the magnetic flux generated by the electric current finds it possible to penetrate into the magnet 4 from the magnetic-pole tooth $1a$, and then to transfer to the magnetic-pole tooth $1c$. Also, the magnetic flux from the adjacent magnetic-pole tooth $1b$ finds it possible to penetrate into the magnet 4, and then to transfer to the magnetic-pole tooth $1d$.

Figure 4:
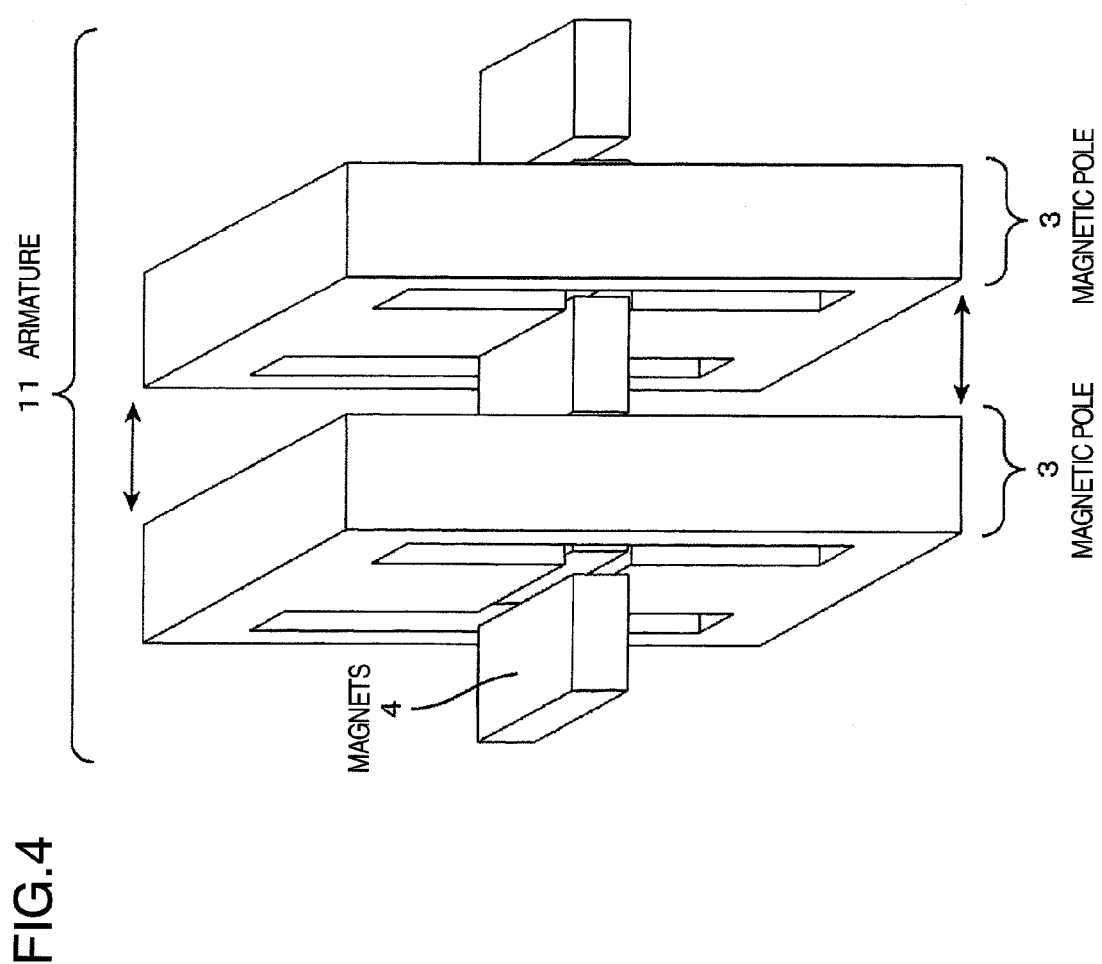
FIG. 4 illustrates the detailed configuration of the first embodiment of the linear motor.

FIG. 4 is a diagram which is obtained when the armature 11 is seen from its oblique side-surface. Namely, FIG. 4 indicates that the magnetic poles 3 constituting the armature 11 are structured such that the spacing between the magnetic poles 3 that are adjacent to each other can be changed arbitrarily. By changing the spacing between the adjacent magnetic poles 3, it becomes possible to control the pulsation of the thrust, and a force (which is generally referred to as "detent") that occurs between the magnetic poles 3 and the magnets 4.

Incidentally, it is possible to adjust the spacing between the adjacent magnetic poles 3 by fixing positions of the respective magnetic poles 3 using a nonmagnetic-substance member.

Figure 5:
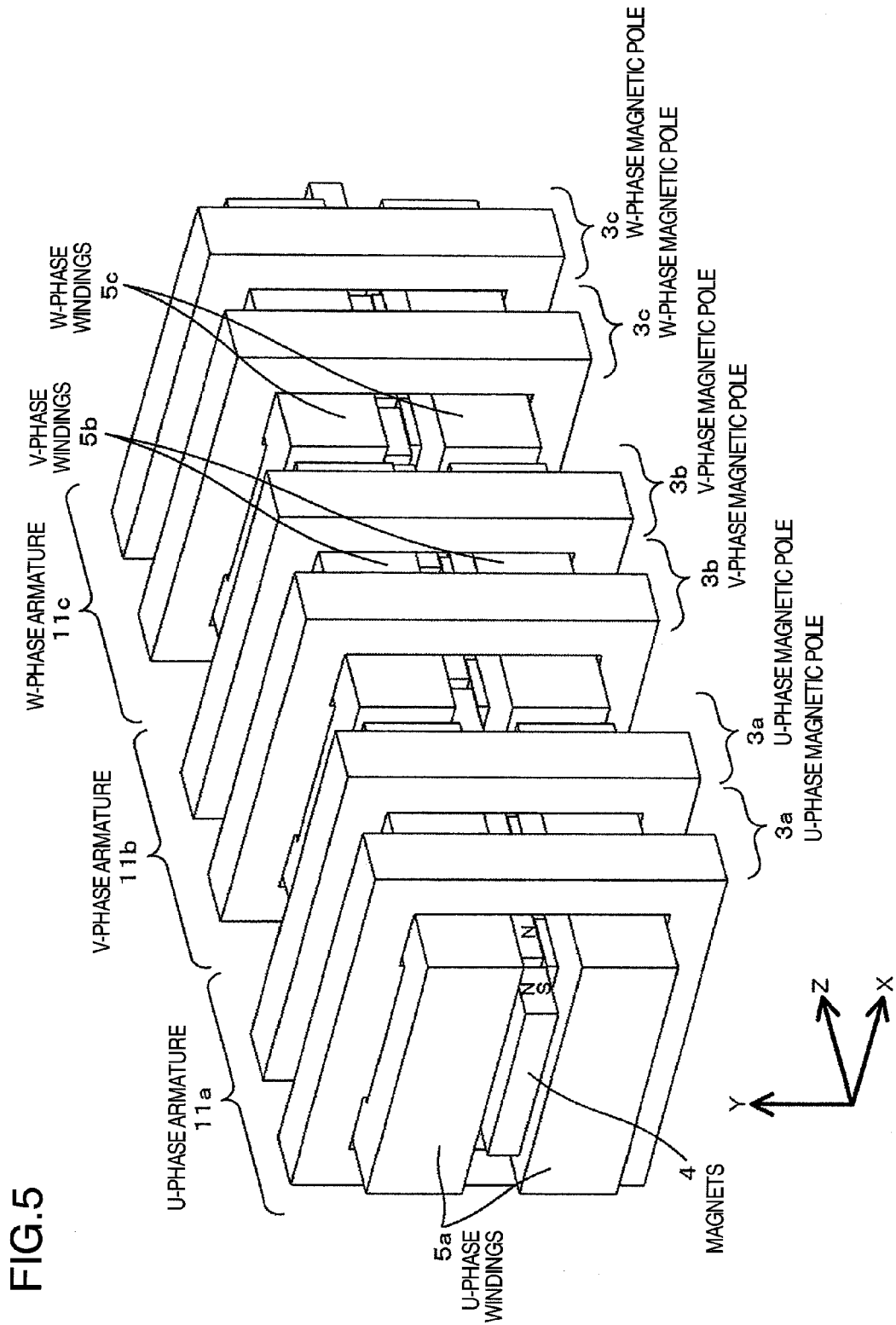
FIG. 5 illustrates the three-phase-driving linear motor in the first embodiment.

FIG. 5 illustrates the example explained in FIG. 1 to FIG. 4, where the three-phase-driving linear motor is configured using the three units of armatures 11. The notations X, Y, and Z denote coordinate-axis directions which are orthogonal to each other. The respective-phase windings $5a$, $5b$, and $5c$ are respectively set up in the respective-phase armatures $11a$, $11b$, and $11c$. Electric currents whose phases are mutually shifted by 120° in terms of the electrical angle are flown along the respective-phase windings $5a$, $5b$, and $5c$. This flowing of the electric currents gives rise to the occurrence of a Z-direction-oriented thrust onto the magnet array (i.e., displacer) which includes the plurality of magnets 4. At this time, the respective-phase armatures $11a$, $11b$, and $11c$ are deployed in such a manner that their phases are mutually shifted by 120° in terms of the electrical angle.

Figure 6:
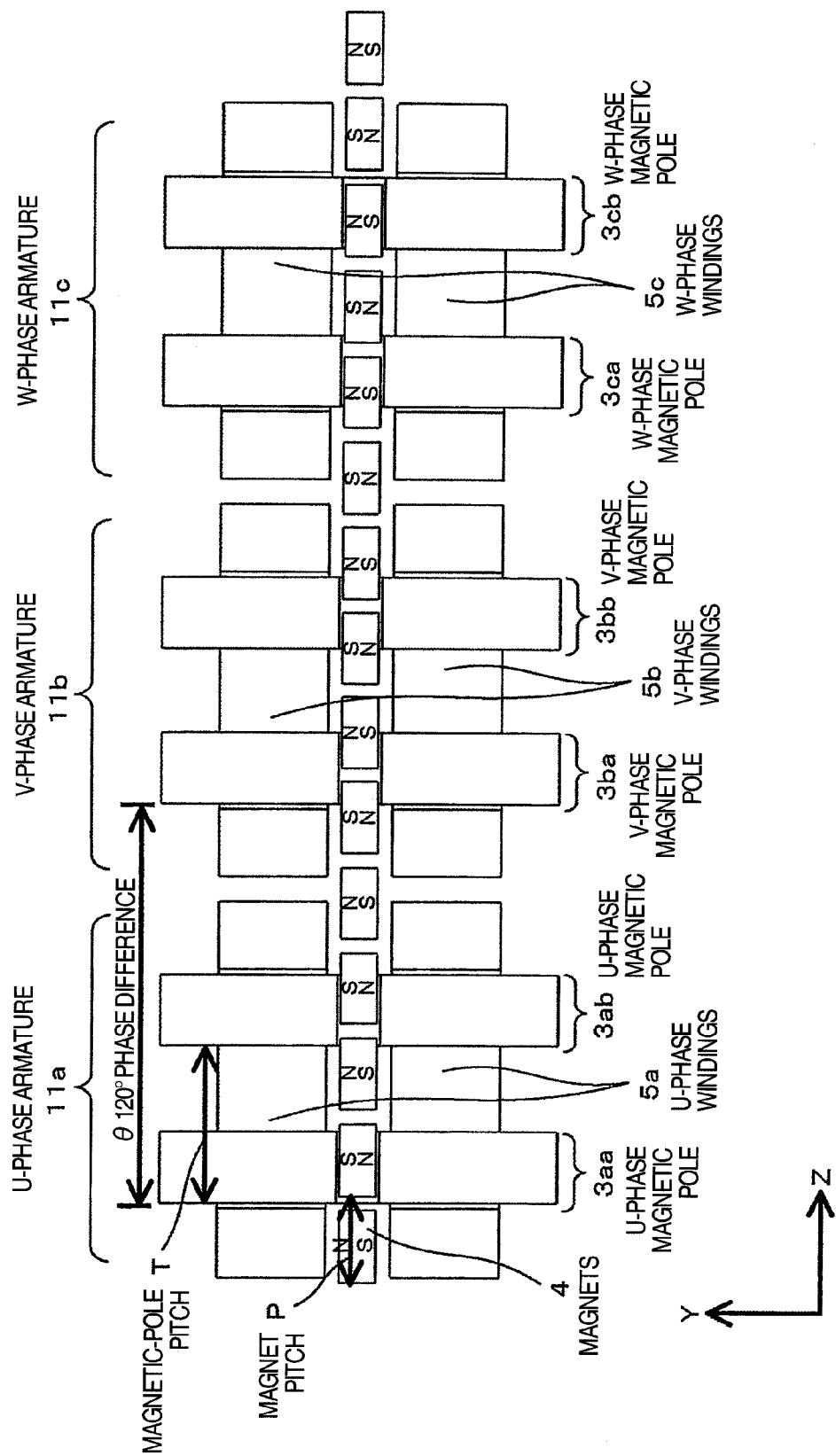
FIG. 6 illustrates a cross-sectional view which is obtained by cutting out the linear motor in FIG. 5 along a Y-Z plane therein.

FIG. 6 illustrates a cross-sectional view which is obtained by cutting out the three-phase-driving linear motor illustrated in FIG. 5 along an Y-Z plane in FIG. 5. When the magnet pitch P is set at 180° in terms of the electrical angle, the U-phase armature $11a$ and the V-phase armature $11b$ are deployed in such a manner that the phase difference θ therebetween at this time becomes equal to 120°. Similarly, the phase difference between the V-phase armature $11b$ and the W-phase armature $11c$ becomes equal to 120°. In the example illustrated in FIG. 6, the three-phase-driving linear motor is configured using the U phase, the V phase, and the W phase. The three-phase-driving linear motor, however, can also be configured by deploying the inverse phase of the W phase between the U phase and the V phase. Namely, the three-phase-driving linear motor can also be configured such that the deployment of the armatures at this time becomes the deployment of the U phase, the inverse phase of the W phase, and the V phase, and such that the inverse phase of the W phase becomes equal to 60°, and the V phase becomes equal to 120° in terms of the electrical angle. In the present embodiment, the explanation has been given concerning the three-phase-driving linear motor. Furthermore, in the case of configuring an n-phase-driving linear motor with reference to the magnet pitch P, the n units of armatures 11 are deployed in such a manner that the phase difference among them becomes equal to 2P/n.

Also, in FIG. 6, the configuration components in the armatures are deployed such that the relationship between the magnet pitch P and the magnetic-pole pitch T (i.e., pitch T between the magnetic poles 3) becomes substantially equal to 2P=T. Here, although the magnet pitch P becomes a fixed value, the magnetic-pole pitch T is displaceable in the Z direction, or the magnitude of the pitch T is changeable. Moreover, making the adjustment of the magnetic-pole pitch allows implementation of a reduction in the thrust pulsation. For example, the configuration components in the armatures are deployed such that the magnetic-pole pitch constituted by the U-phase magnetic pole $3aa$ and the U-phase magnetic pole $3ab$ becomes equal to (2P−P/m) (m: order of higher harmonics whose thrust pulsation is wished to be reduced). Similarly, the configuration components in the armatures are deployed as follows: The magnetic-pole pitch constituted by the V-phase magnetic pole $3ba$ and the V-phase magnetic pole $3bb$ becomes equal to (2P−P/m), and the magnetic-pole pitch constituted by the W-phase magnetic pole $3ca$ and the W-phase magnetic pole $3cb$ becomes equal to (2P−P/m). Simultaneously, the phase difference between the U-phase magnetic pole $3aa$ and the V-phase magnetic pole $3ba$ becomes equal to 120° in terms of the electrical angle, and the phase difference between the U-phase magnetic pole $3aa$ and the W-phase magnetic pole $3ca$ becomes equal to 240° in terms of the electrical angle. The implementation of this deployment allows implementation of a reduction in the m-th-order pulsation component. In this way, the magnetic poles are displaceable in the Z direction on each magnetic-pole-tooth basis. This feature makes it possible to reduce the thrust pulsation of an arbitrary order, and to adjust an unbalance caused by a variation in the dimension of the armatures at the time of manufacturing thereof.

2nd Embodiment

Figure 7:
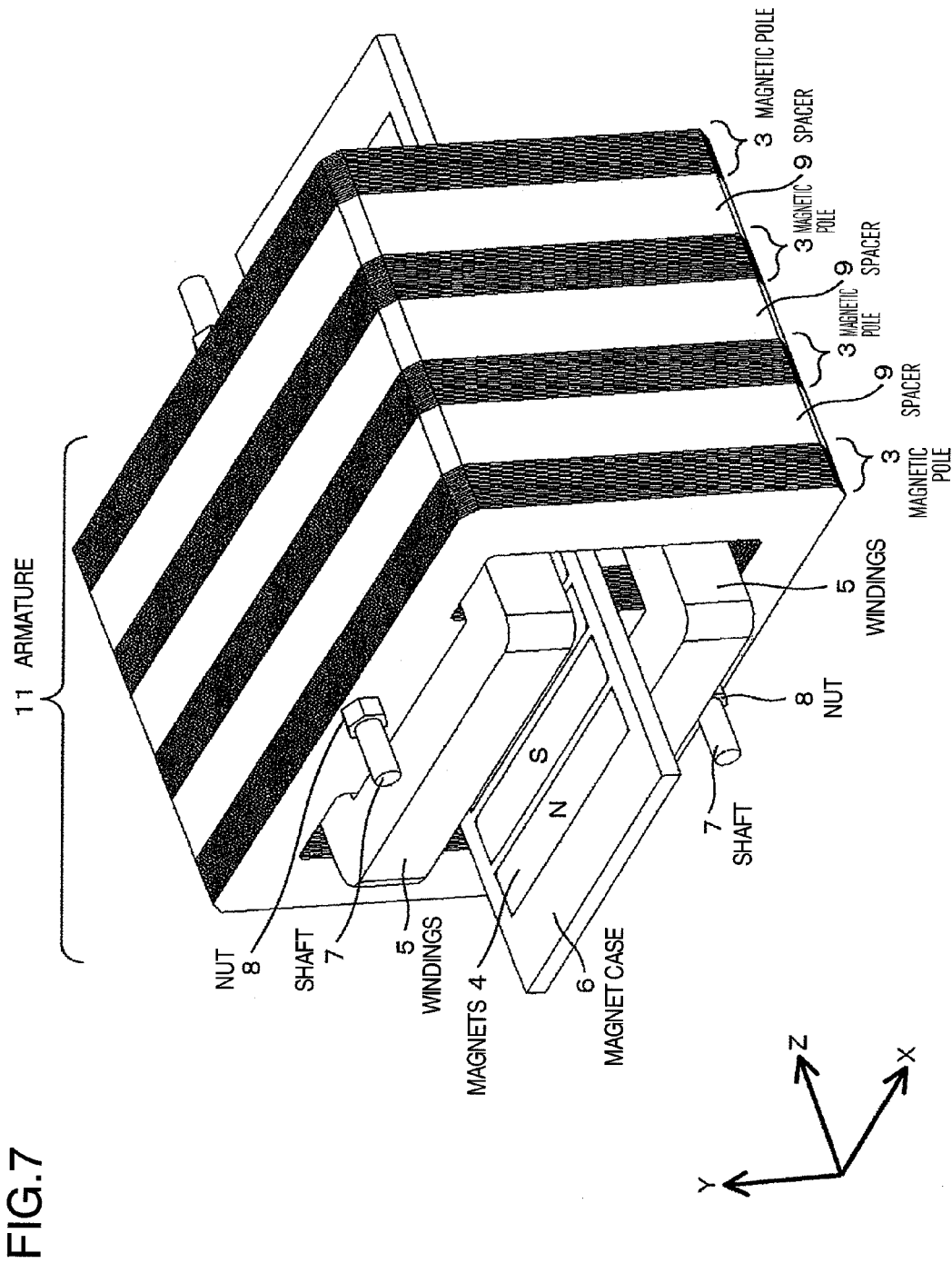
FIG. 7 illustrates a second embodiment of the linear motor of the present invention.

FIG. 7 illustrates a second embodiment of the linear motor of the present invention. In FIG. 1, the case of the armature 11 including the two units of magnetic poles 3 has been illustrated. Also, the single magnetic pole 3 is constituted with the magnetic-pole teeth 1 and the iron core 2 for connecting these magnetic-pole teeth 1 to each other. In FIG. 7, however, a case of the armature 11 including the four units of magnetic poles 3 is illustrated. Each of the magnetic poles 3 is configured by multilayering a plurality of thin plate-like magnetic poles. Also, the magnets 4, which are fixed onto a magnet case 6, are arranged in the Z direction such that their N poles and S poles appear in an alternate manner. Flowing an electric current along the windings 5 in this state causes a force to be exerted onto the magnets 4, thereby giving rise to the generation of a Z-direction-oriented thrust. This Z-direction-oriented thrust makes it possible to displace the displacer which includes the magnets 4 and the magnet case 6. The magnetic poles 3, each of which is configured with the plurality of thin plate-like magnetic poles, are fixed by shafts 7 and nuts 8 with a spacer 9 intervened between the magnetic poles 3.

Figure 8:
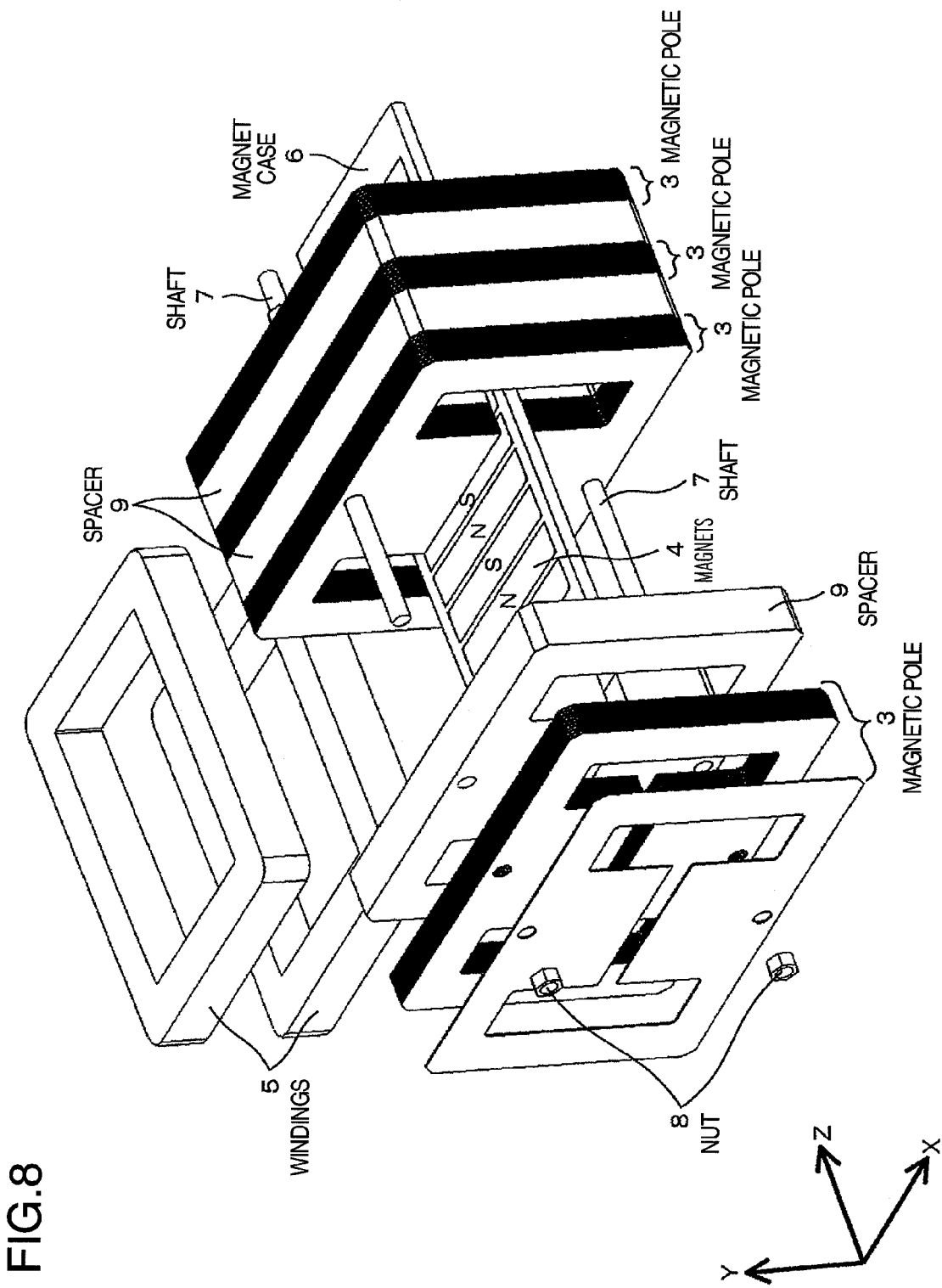
FIG. 8 illustrates an exploded view of the linear motor in FIG. 7.
Figure 9:
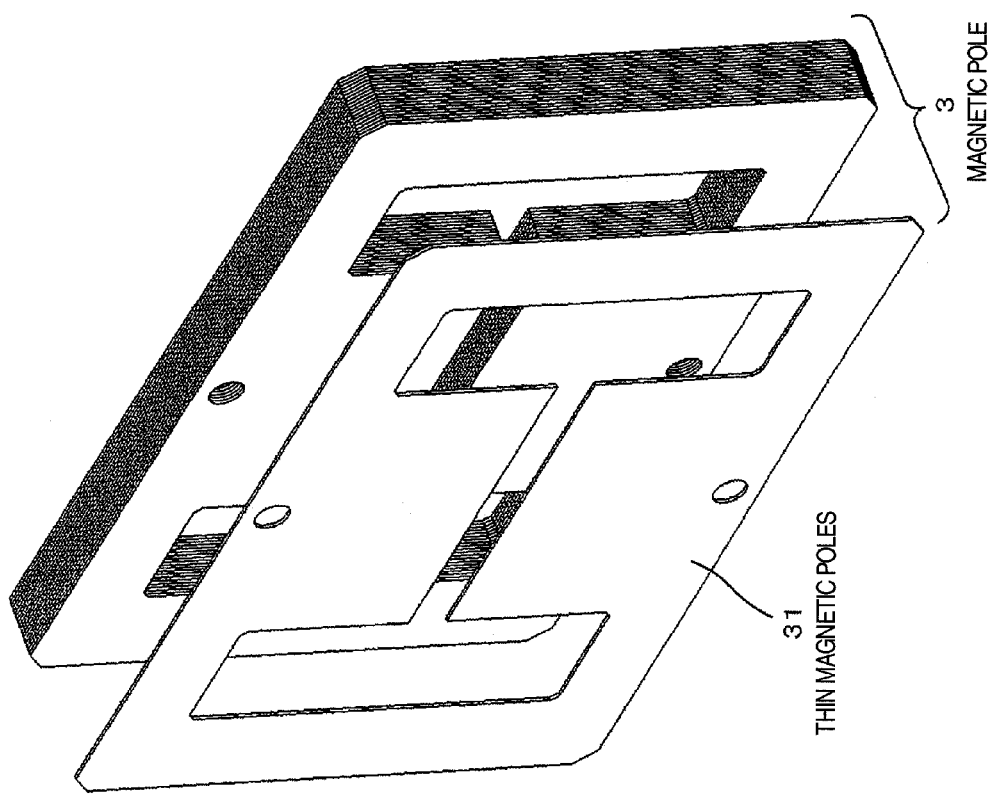
FIG. 9 illustrates the detailed configuration of the second embodiment of the linear motor.

FIG. 8, which is an exploded view of FIG. 7, is the diagram where the windings 5 are removed, and where the magnetic pole 3 and the spacer 9 are disassembled into the Z direction. Also, FIG. 9 is a diagram where the portion of the magnetic pole 3 is extracted. Each magnetic pole 3 in the present embodiment is configured by multilayering the plurality of thin magnetic poles 31. Accordingly, there exists the following advantage: Namely, by changing the number of the thin magnetic poles 31, it becomes possible to adjust the thickness of each magnetic pole 3, and to adjust the number of the magnetic poles using the thin and same-profile magnetic poles 31. Also, the profiles of the thin magnetic poles 31 are not necessarily required to be the same profile. Namely, the enhancement in the thrust and the adjustment of the thrust pulsation are made executable by changing the dimension of the magnet-oppositely-deployed portion for each thin magnetic pole 31. In this way, the multilayering direction of the thin magnetic poles 31 is made identical to the direction (i.e., Z direction) in which the thrust is generated. This condition makes it easier to adjust each magnetic pole, and to change the number of the magnetic poles, thereby allowing the expectation of a cost reduction eventually.

3rd Embodiment

Figure 10:
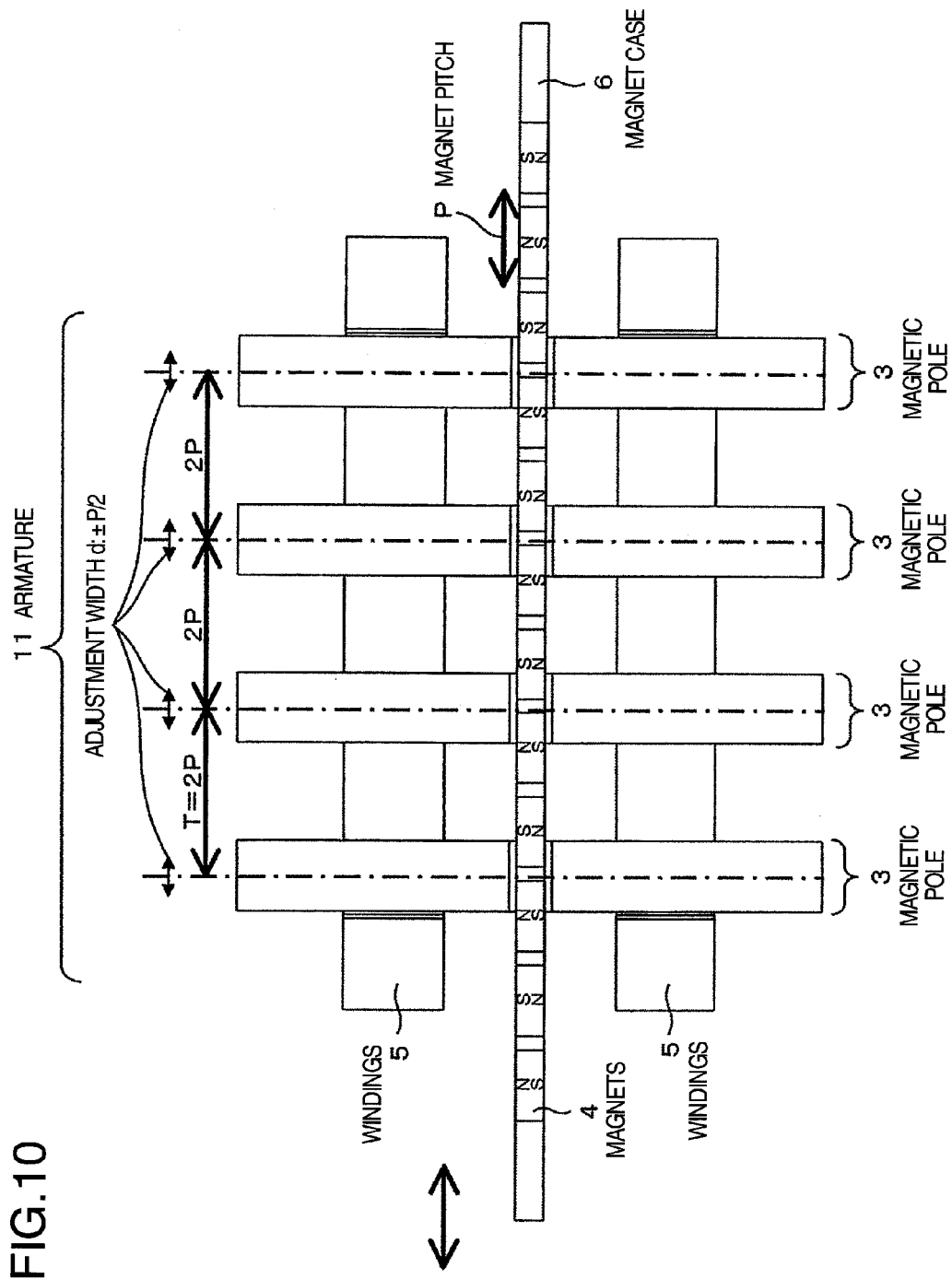
FIG. 10 illustrates a third embodiment of the linear motor of the present invention.

FIG. 10 illustrates a third embodiment of the linear motor of the present invention. FIG. 10 illustrates the case where the four units of magnetic poles 3 illustrated in FIG. 1 are deployed. Here, the configuration components in the armature are deployed as follows: Namely, with reference to the pitch P between the magnets 4 (i.e., magnet pitch P), the pitch T between the magnetic poles 3 (i.e., magnetic-pole pitch T) is made equal to 2nP (n=1, 2, 3, . . . , i.e., arbitrary integer). In FIG. 10, n=1 is set. When the magnetic poles 3 are deployed on each 2nP basis, the thrust becomes equal to its maximum value. Consideration, however, is given to the case where the magnetic-pole positions are shifted in order to reduce the pulsation of the thrust or the like. In this case, in order to implement the reduction effect on the pulsation component of the thrust corresponding to a lowering in the thrust, it is the most advisable to set the adjustment width d of the magnetic poles 3 into a range of ±P/2.

Figure 11:
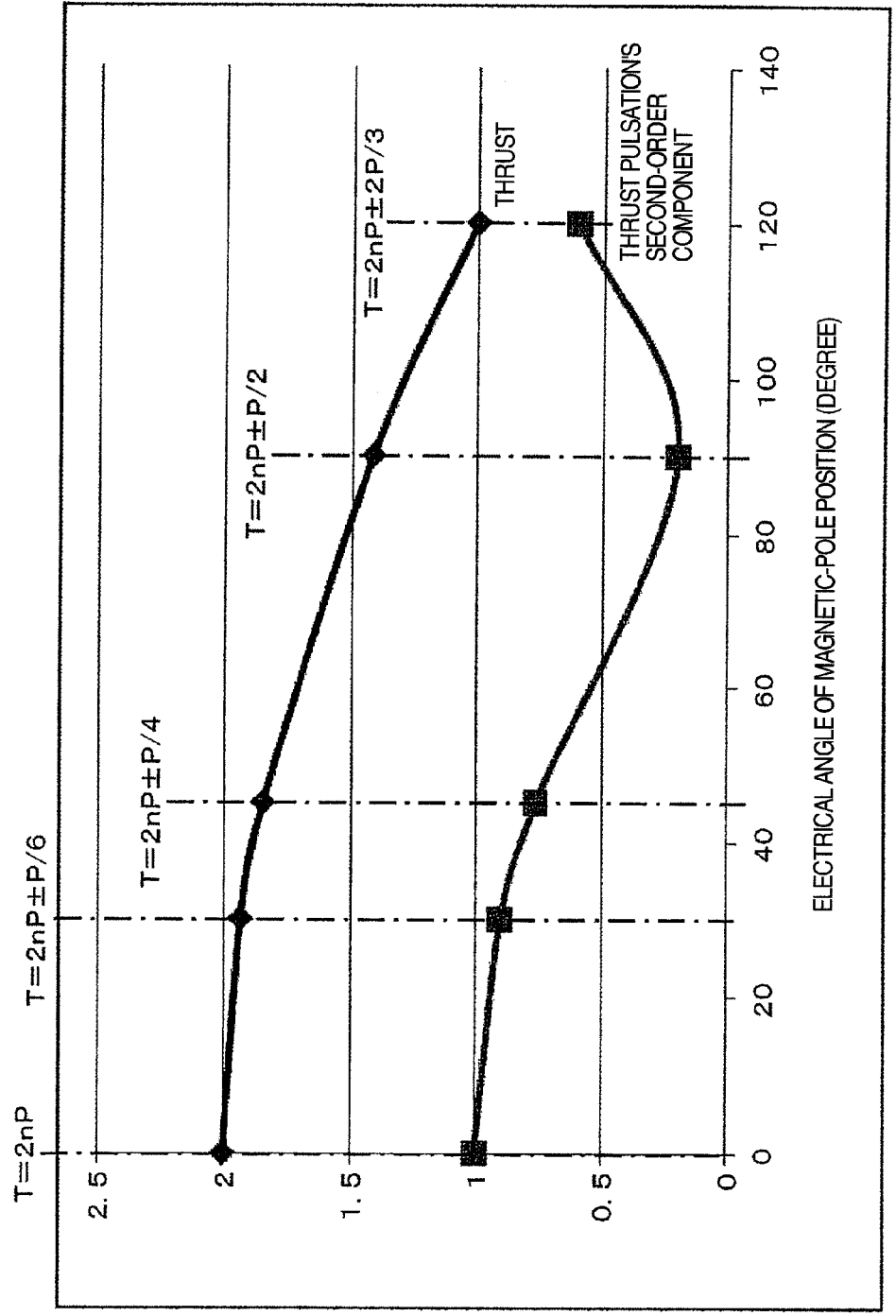
FIG. 11 illustrates a change in the thrust of the linear motor of the present invention, and a change in the second-order higher-harmonics component of the thrust.

FIG. 11 illustrates a change in the thrust and a change in the second-order higher-harmonics component of the thrust when the pitch T between the magnetic poles 3 is changed. When the magnetic-pole pitch T is set at 2nP, the thrust becomes equal to its maximum value. At this time, however, the pulsation component of the thrust (i.e., second-order higher-harmonics component of the thrust in the example in FIG. 11) also becomes equal to its maximum value. Then, adjusting the positions of the magnetic poles 3 to gradually enlarge the adjustment width d results in the occurrence of a lowering in the thrust. Simultaneously, this operation results in the occurrence of a lowering in the pulsation component of the thrust as well. In this way, the second-order pulsation component of the thrust becomes equal to its minimum value at T=(2nP±P/2). Then, if the adjustment width d is enlarged further, the thrust becomes lowered further. Conversely, however, the second-order pulsation component of the thrust turns out to become enlarged. In the present embodiment, the explanation has been given regarding the second-order pulsation component. If, however, the order increases like the third order, fourth order, . . . , the relative-minimum position of the pulsation component of each order becomes equal to T=(2nP±P/3), (2nP±P/4), . . . . This means that the adjustment width d becomes smaller. Consequently, in order to reduce the second-order-or-higher pulsation component, it is the most effective to set the adjustment width d of the magnetic poles 3 into the range of ±P/2 from the positions at which the magnetic poles 3 are deployed at the magnetic-pole pitch T=2P.

4th Embodiment

FIG. 12 illustrates a fourth embodiment of the linear motor of the present invention. FIG. 12 illustrates the case where the four units of magnetic poles 3 illustrated in FIG. 1 are deployed. Here, the windings 5 are wound around the plurality of magnetic-pole teeth in batch. On account of this configuration, magnetic fluxes exerted from the magnetic-pole teeth onto the magnet 4 are uniquely determined by the direction of an electric current to be flown along the windings 5. Accordingly, the present embodiment exhibits a feature that the directions of the magnetic fluxes of the mutually adjacent magnetic poles become one and the same direction. The implementation of a deployment like this makes it possible to almost cancel out the influence exerted by a leakage magnetic flux between the adjacent magnetic poles. Consequently, the present embodiment exhibits an advantage that the thrust relative to the electric current can be enhanced.

5th Embodiment

Figure 13A:
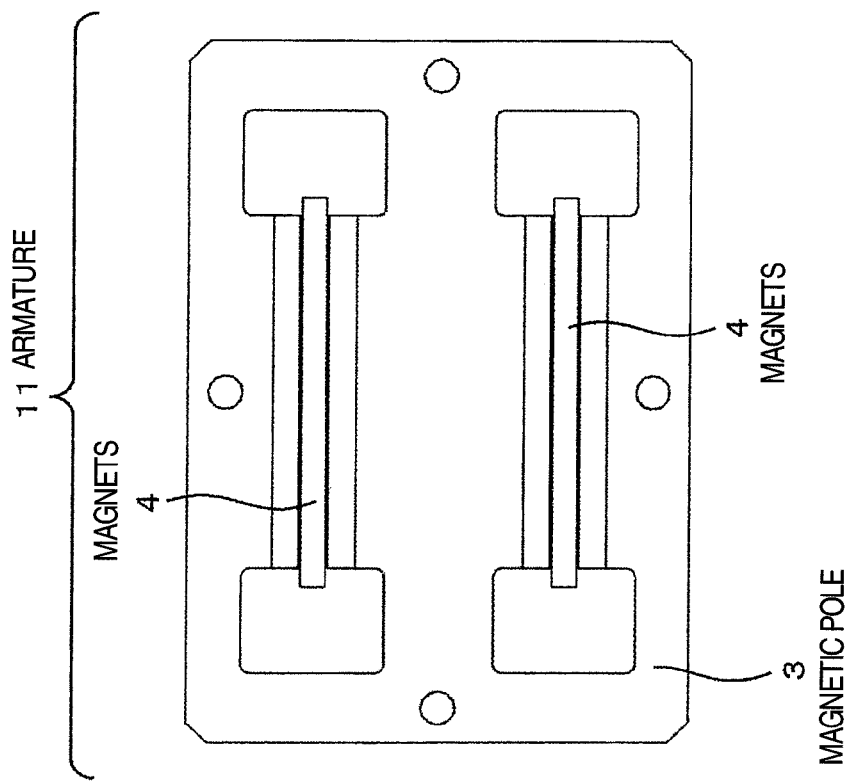
FIG. 13A and FIG. 13B illustrate a fifth embodiment of the linear motor of the present invention.
Figure 13B:
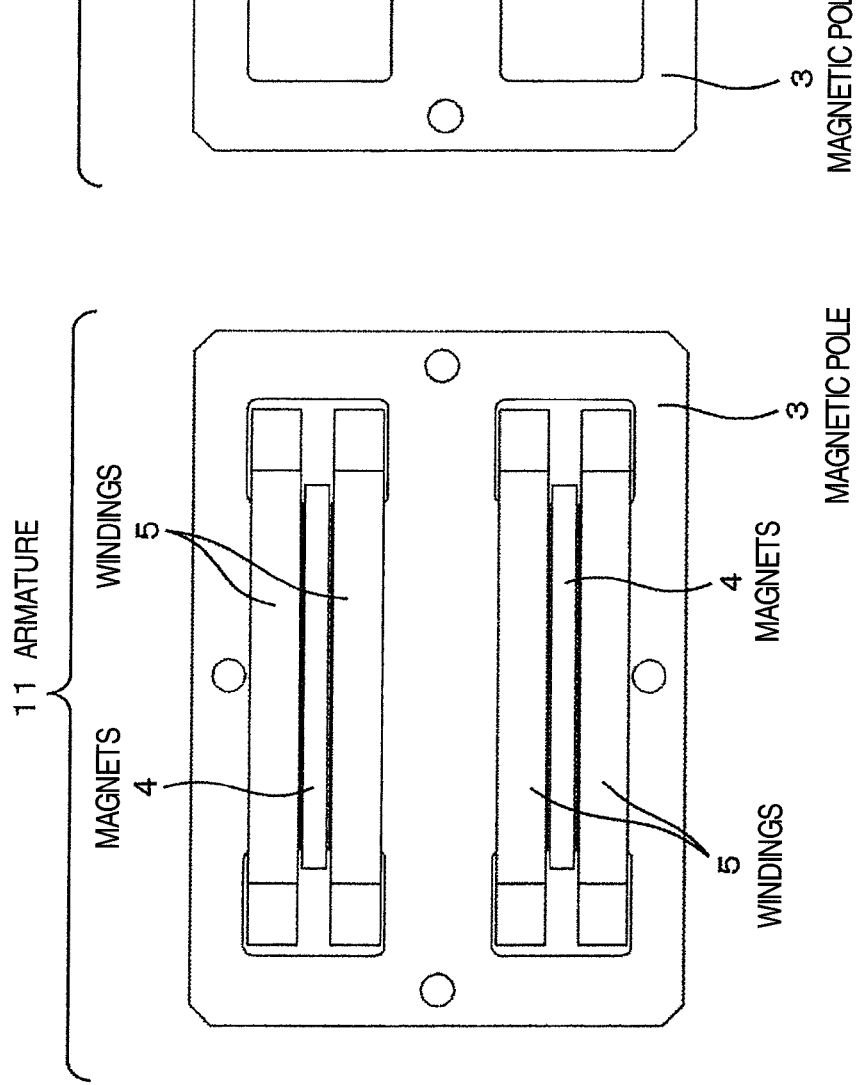

FIG. 13A and FIG. 13B illustrate a fifth embodiment of the linear motor of the present invention. The configuration implemented and illustrated in FIG. 13A is as follows: The two units of magnetic poles 3 illustrated in FIG. 1 are deployed inside one and the same magnetic circuit. In FIG. 13A, the magnetic pole 3 is constituted with the magnetic-pole teeth for sandwich-holding the upper-side and lower-side magnets 4. The windings 5 are wound around each of the magnetic-pole teeth. FIG. 13B is the diagram where the windings 5 are removed for making the cross-sectional profile easier to understand. The implementation of a configuration like this allows the respective upper-side and lower-side magnet arrays to be controlled individually, or to be driven simultaneously. Also, controlling the direction of an electric current to be flown along the windings 5 makes it possible to control saturation of the magnetic pole. Also, making an effective use of the magnetic fluxes of the magnetic poles makes it possible to downsize the magnetic poles.

Figure 14:
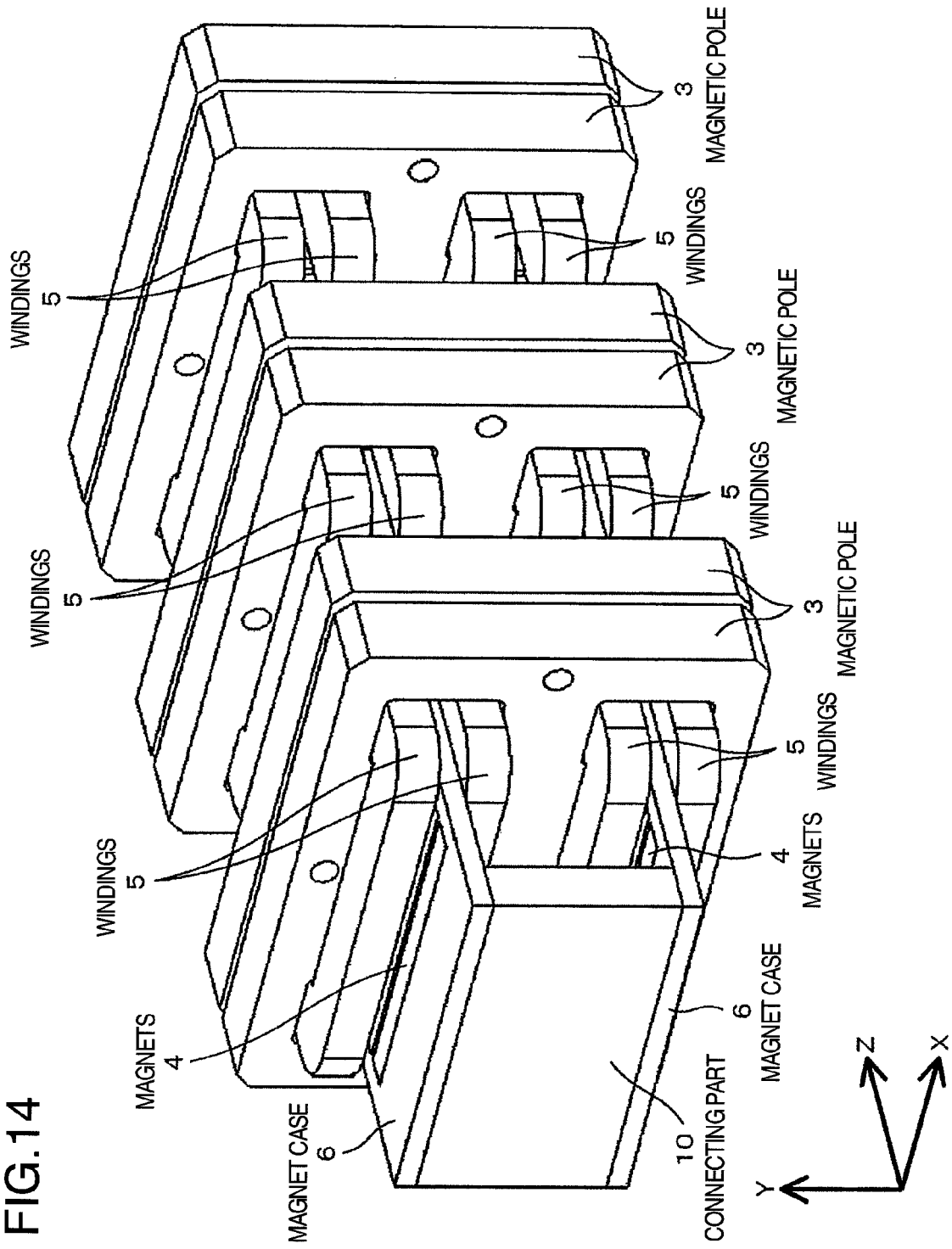
FIG. 14 illustrates the detailed configuration of the fifth embodiment of the linear motor in FIG. 13A and FIG. 13B.
Figure 15:
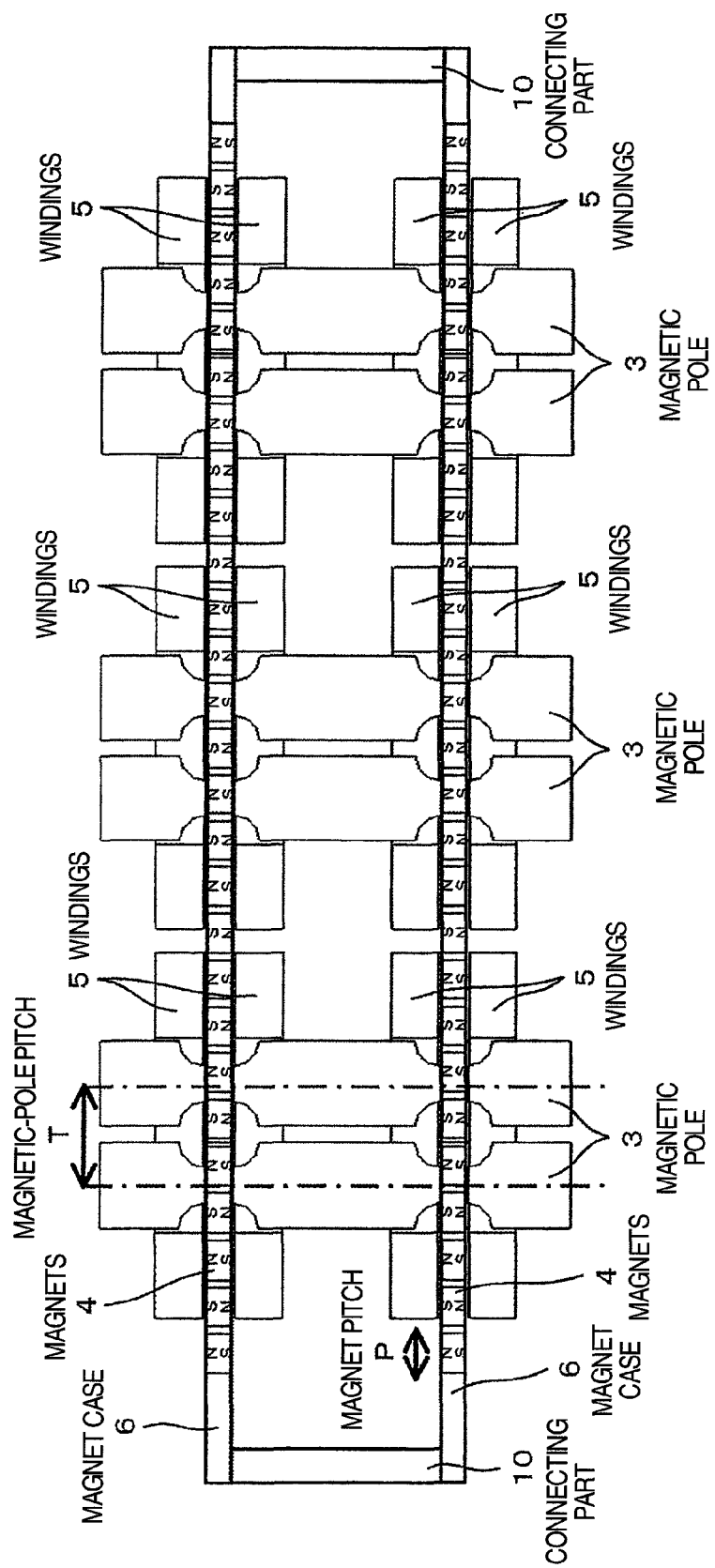
FIG. 15 illustrates a cross-sectional view which is obtained by cutting out the linear motor in FIG. 14 along a Y-Z plane therein.

FIG. 14 illustrates a configuration diagram of the armatures-used three-phase-driving linear motor illustrated in FIG. 13A and FIG. 13B. In the present embodiment, the two units of magnet cases 6 for fixing the magnets 4 are deployed, and are connected to each other by using a connecting part 10. This configuration makes it possible to strengthen the rigidity of a member including the magnets 4, the magnet cases 6, and the connecting part 10. Moreover, FIG. 15 illustrates a cross-sectional view which is obtained by cutting out the three-phase-driving linear motor illustrated in FIG. 14 along a Y-Z plane in FIG. 14. The structure implemented in the present embodiment is as follows: The profile of the portion of the magnetic poles 3 opposed to the magnets 4 is made gradually narrower and narrower in the direction oriented to the magnets 4. This structure makes it possible to concentrate the magnetic fluxes. The configuration components in the armature are deployed such that, with reference to the magnet pitch P, the magnetic-pole pitch T becomes substantially equal to 2P=T. Accordingly, the three units of armatures 11 are deployed which are equivalent to the three phases. In the present embodiment, the upper-side and lower-side magnet arrays connected to the upper-side and lower-side's two units of magnet cases 6 are so deployed as to have the same-direction magnetic poles. Depending on the direction of the electric current to be flown along the windings 5, however, the upper-side and lower-side magnet arrays may also be so deployed as to have the mutually-opposite magnetic poles. Like the present embodiment, the magnet arrays constituted with the plurality of magnets and magnet cases are deployed inside one and the same magnetic circuit constituted with the same magnetic poles 3. The implementation of a deployment like this makes it possible to make an effective use of the magnetic fluxes, thereby allowing implementation of the downsizing of the magnetic poles. Also, the connection of these plurality of displacers allows implementation of the enhancement in the rigidity of the displaceable portion including the displacers.

6th Embodiment

Figure 16:
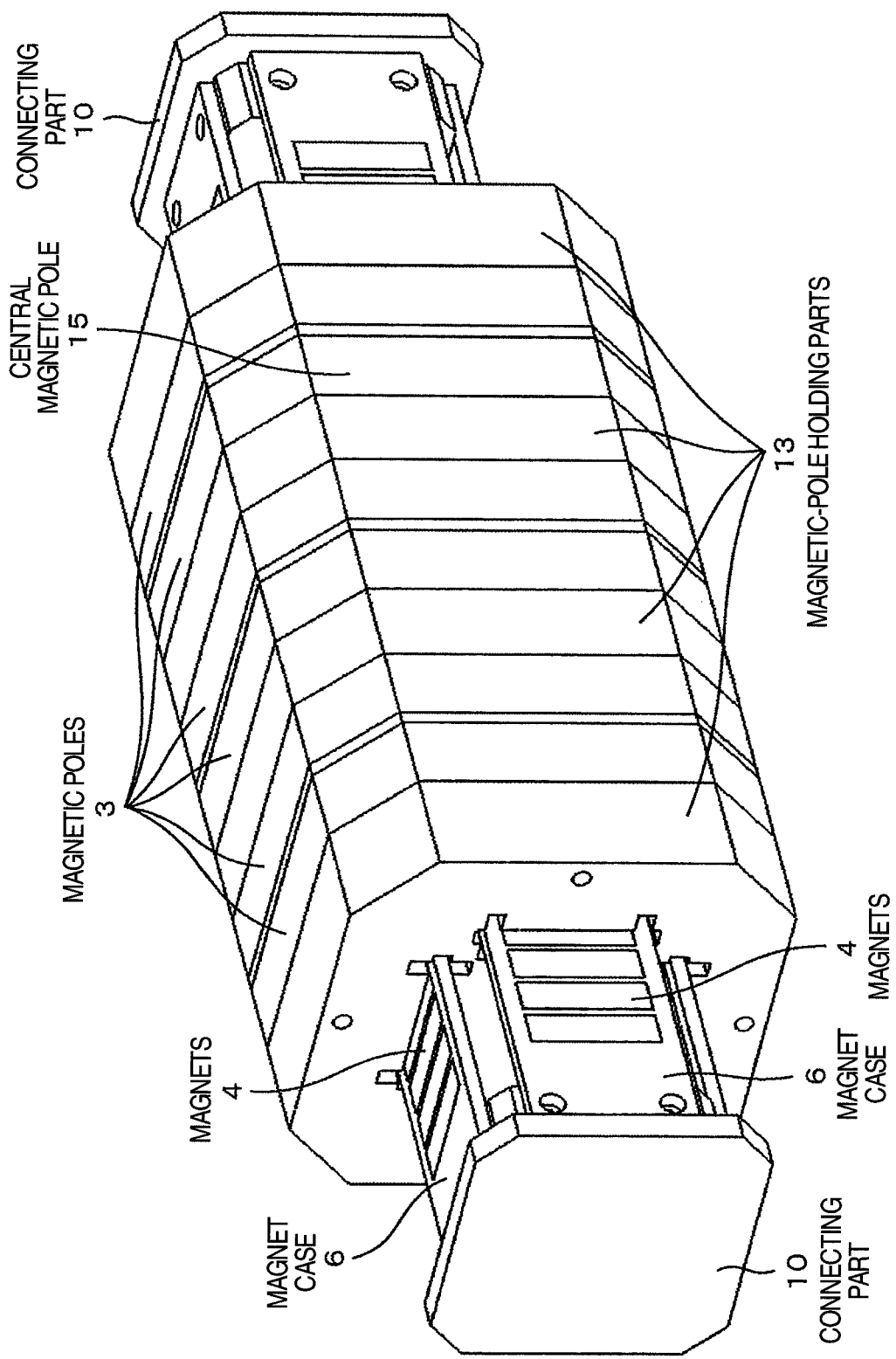
FIG. 16 illustrates a sixth embodiment of the linear motor of the present invention.
Figure 17:
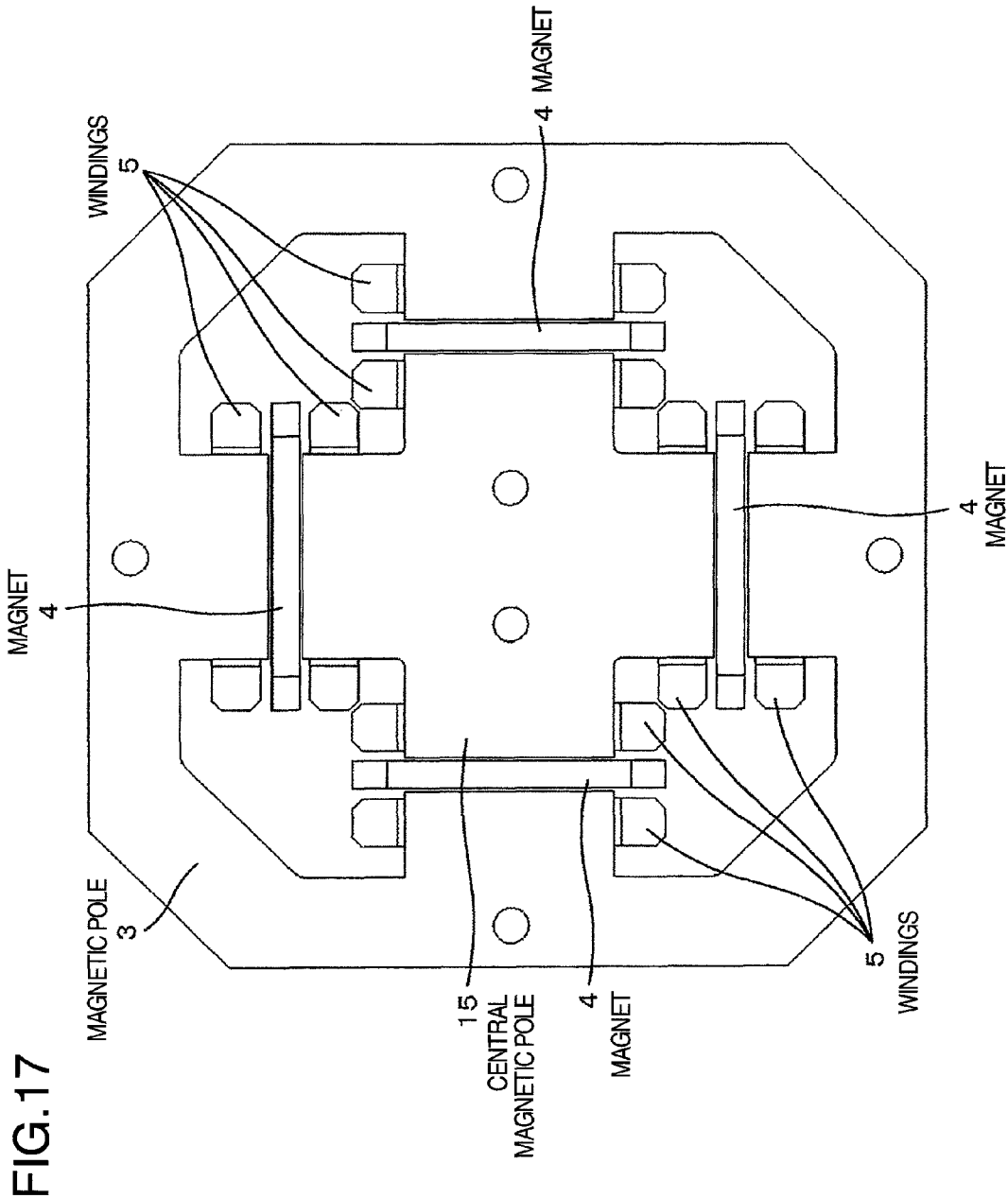
FIG. 17 illustrates the perpendicular cross-section of the linear motor in FIG. 16.
Figure 18:
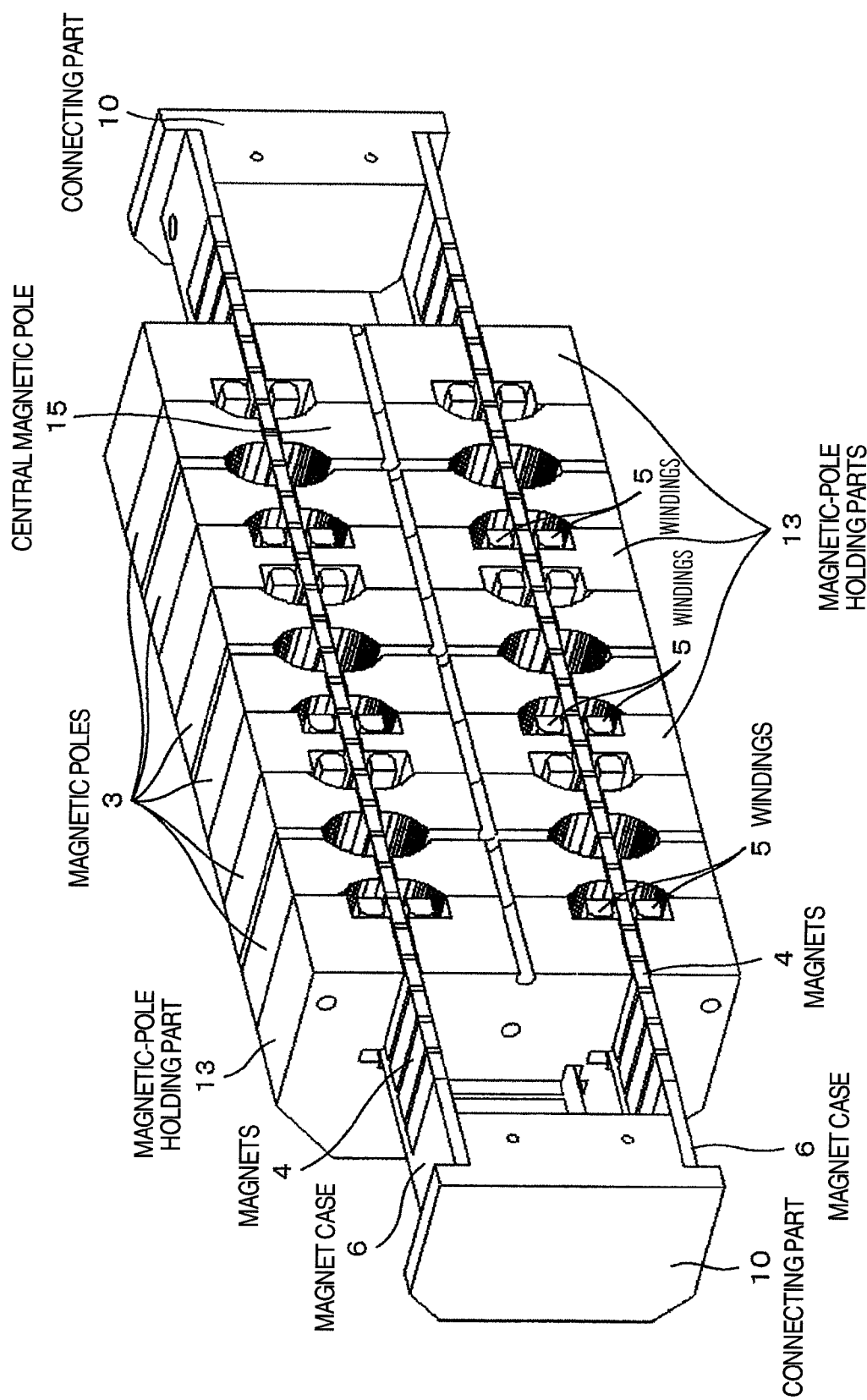
FIG. 18 illustrates a cross-sectional view of the linear motor in FIG. 16 in the longitudinal direction.
Figure 19:
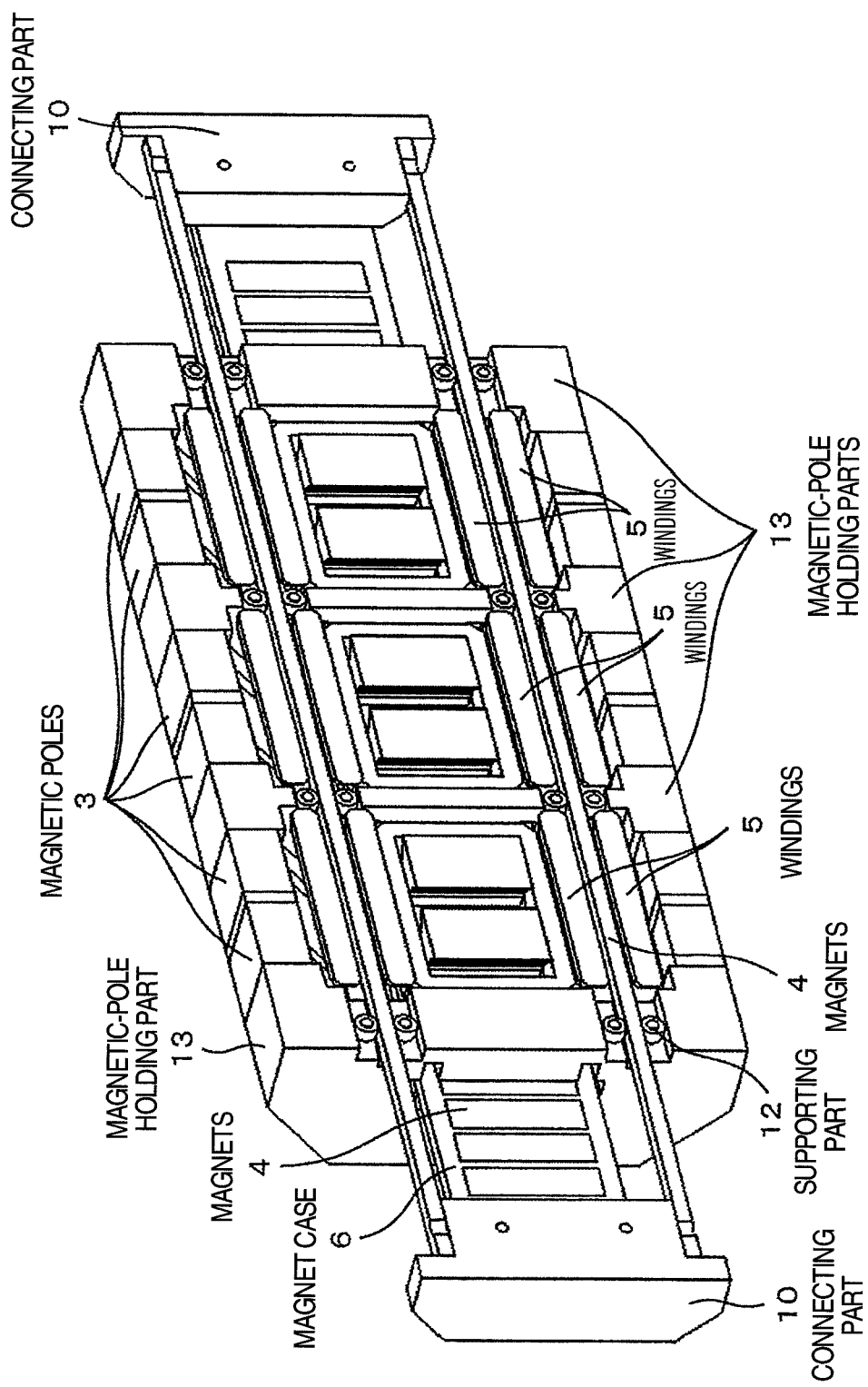
FIG. 19 illustrates the cross-sectional view of the linear motor in FIG. 16 in the longitudinal direction.
Figure 20:
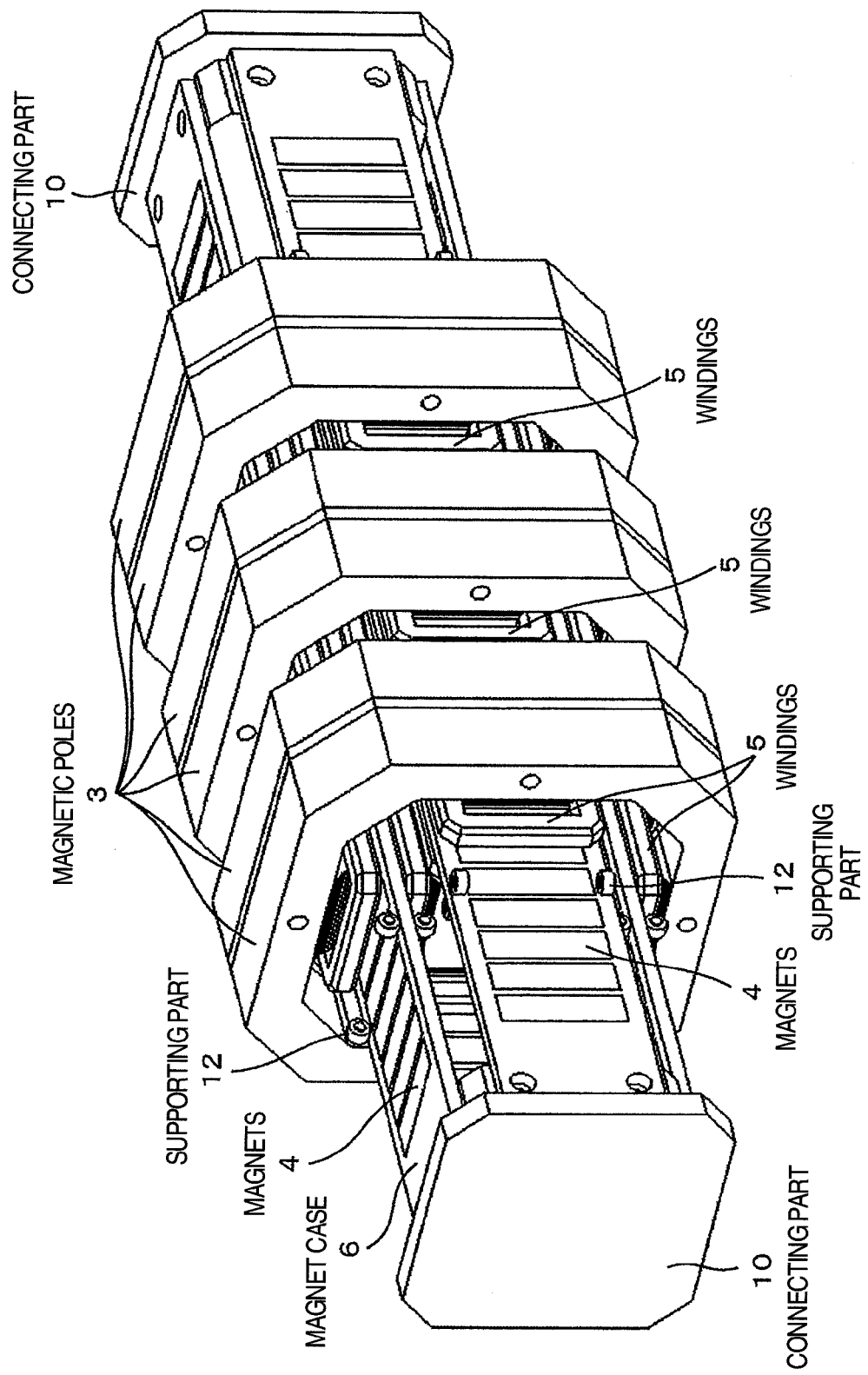
FIG. 20 illustrates the detailed configuration of the sixth embodiment of the linear motor.
Figure 21:
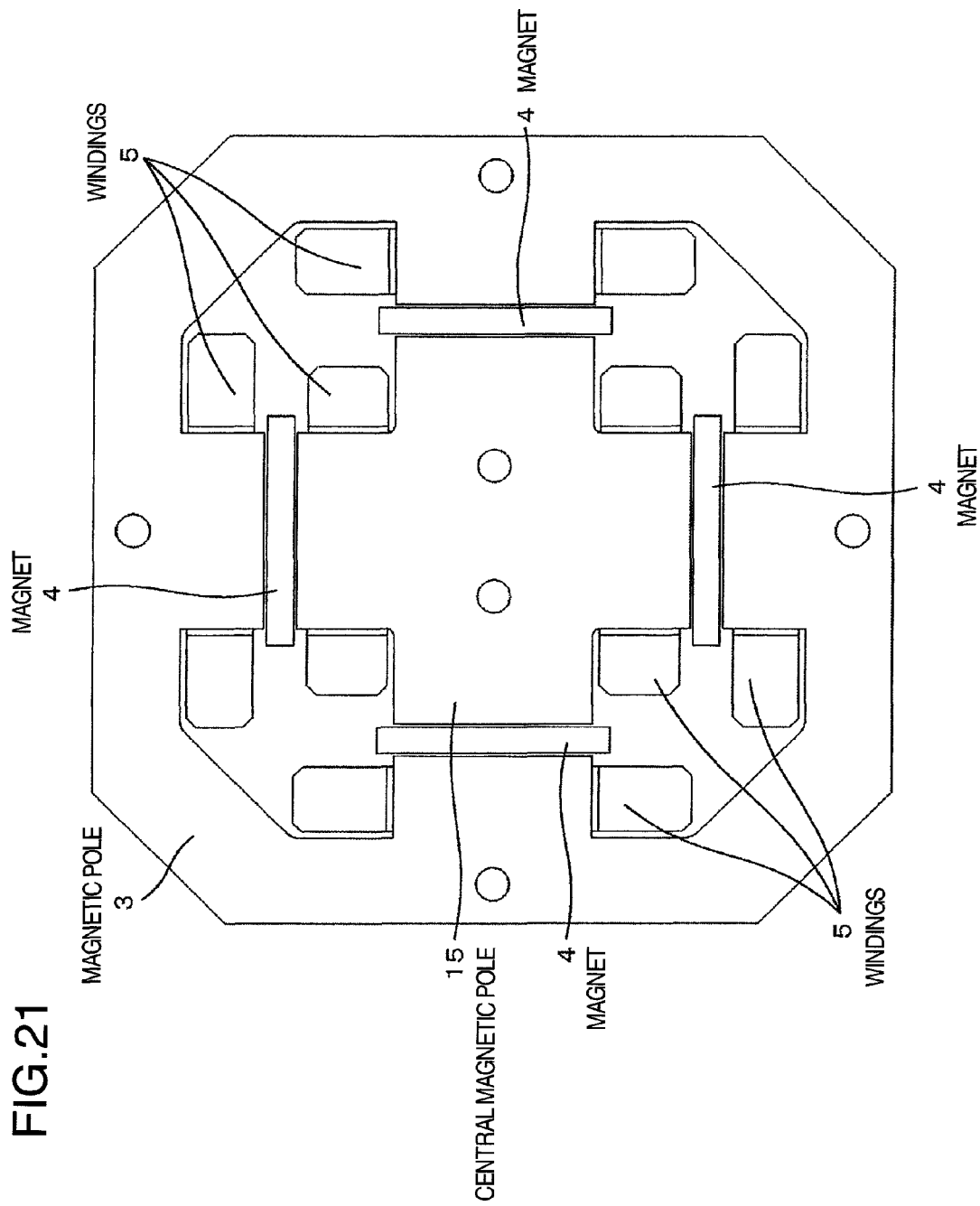
FIG. 21 illustrates the detailed configuration of the sixth embodiment of the linear motor.

FIG. 16 illustrates a sixth embodiment of the linear motor of the present invention. In the linear motor illustrated in FIG. 16, the magnet cases 6 for fixing the magnets 4 are formed into a four-axis configuration, and are connected to each other by using the connecting parts 10. Also, the spacing between the respective-phase magnetic poles and the edges of the magnetic poles are so configured as to be sandwich-held by magnetic-pole holding parts 13. The integration of the plurality of magnet arrays allows implementation of an enhancement in the rigidity of the displacers. This enhancement in the rigidity makes the displacers available for a kind of usage which is intended to acquire a large thrust. FIG. 17 illustrates a cross-sectional view which is obtained by cutting out the portion of the magnetic poles 3 illustrated in FIG. 16 in a manner of being perpendicular to the longitudinal direction of the displacers. The magnetic pole 3 is so deployed as to be opposed to the individual magnets 4. In the central portion, a cross-character-profiled central magnetic pole 15 is so deployed as to be brought into contact with the four units of magnets 4. The windings 5 are wound around the magnetic pole 3 on each magnet-opposed-portion basis. Also, the N poles and S poles of the magnets 4 are so deployed as to appear in an alternate manner in the longitudinal direction in which the magnets 4 are arranged. The relative poles of the four units of magnets 4, however, can also be changed by the directions of the magnetic fluxes generated by the windings 5. FIG. 18 illustrates a cross-sectional view of the linear motor in FIG. 16 in the longitudinal direction. In the present embodiment, the profile of each of the portions of the magnetic pole 3 opposed to the magnets 4 is made gradually narrower and narrower in the direction oriented to the magnets 4. As is the case with FIG. 18, FIG. 19 is the cross-sectional view of the linear motor in FIG. 16 in the longitudinal direction. In FIG. 19, however, the position of the cross-section is shifted so that a supporting method for supporting the magnet case 6 can be understood. In FIG. 19, the magnet case 6 is supported by a supporting part 12. The part which is usable as the supporting part 12 is a roller, roller bearing, or linear guide. The supporting part 12, which is set up in the magnetic-pole holding parts 13, is so configured as to hold the magnet case 6. The magnetic-pole holding parts 13 are capable of holding the windings 5 as well. FIG. 20 illustrates a diagram where the magnetic-pole holding parts 13 are removed from FIG. 16 so that the inside of the linear motor can be confirmed. In FIG. 20, the supporting part 12 is so set up as to sandwich-hold the plate-like magnet case 6 from both sides thereof. It is possible, however, to implement a structure where the supporting part 12 supports only the outside of the four magnet arrays, or only the inside of the four magnet arrays. The supporting from the one side alone allows implementation of a reduction in the number of supporting points, thereby resulting in effects on reductions in the number of parts and the cost. FIG. 21 illustrates a configuration where, as compared with FIG. 17, the effective utilization of space is implemented by making the windings 5 of the cross-character-profiled portion of the central magnetic pole 15 common to the magnetic poles.

Figure 22:
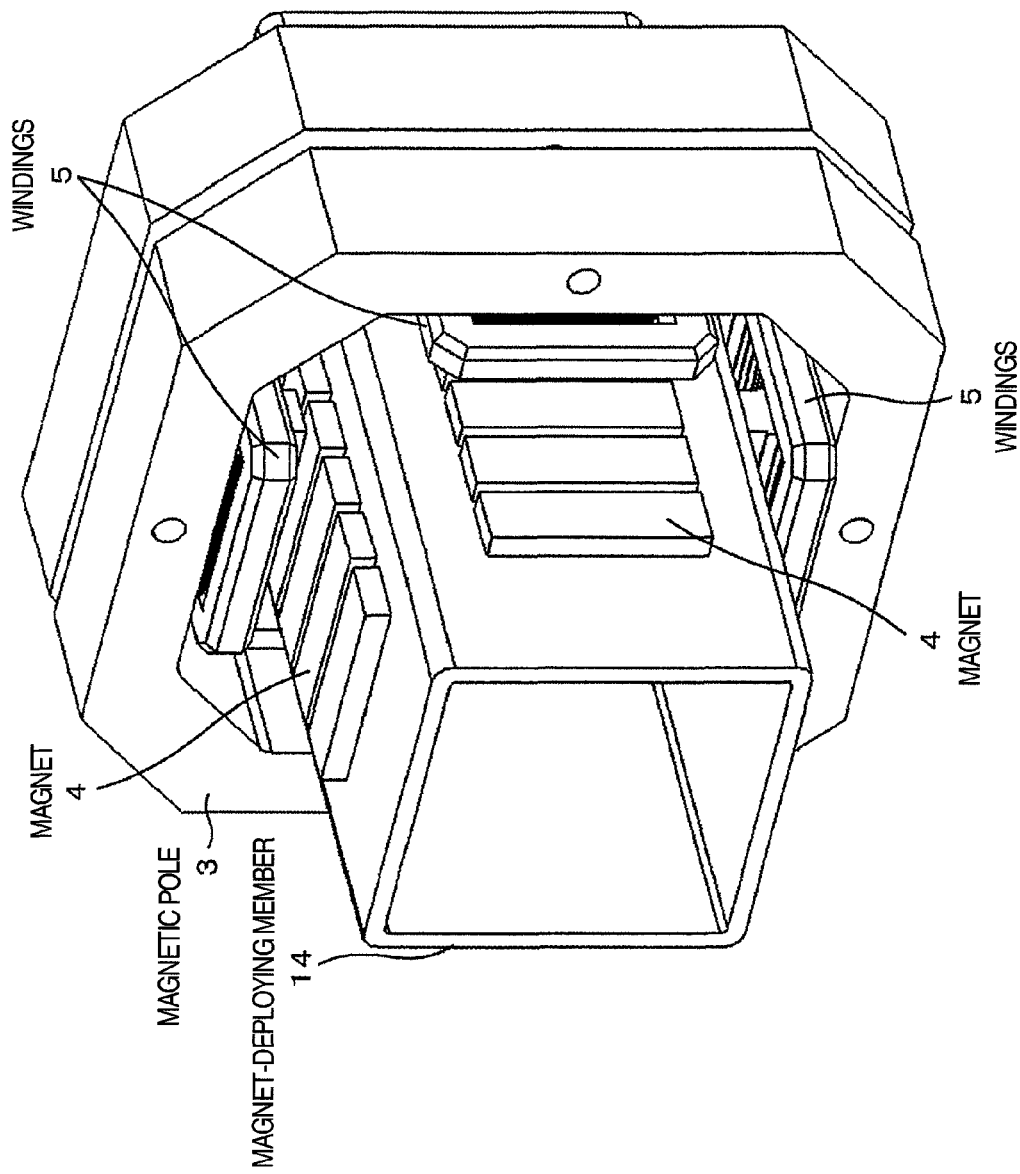
FIG. 22 illustrates the detailed configuration of the armature of the linear motor.
Figure 23:
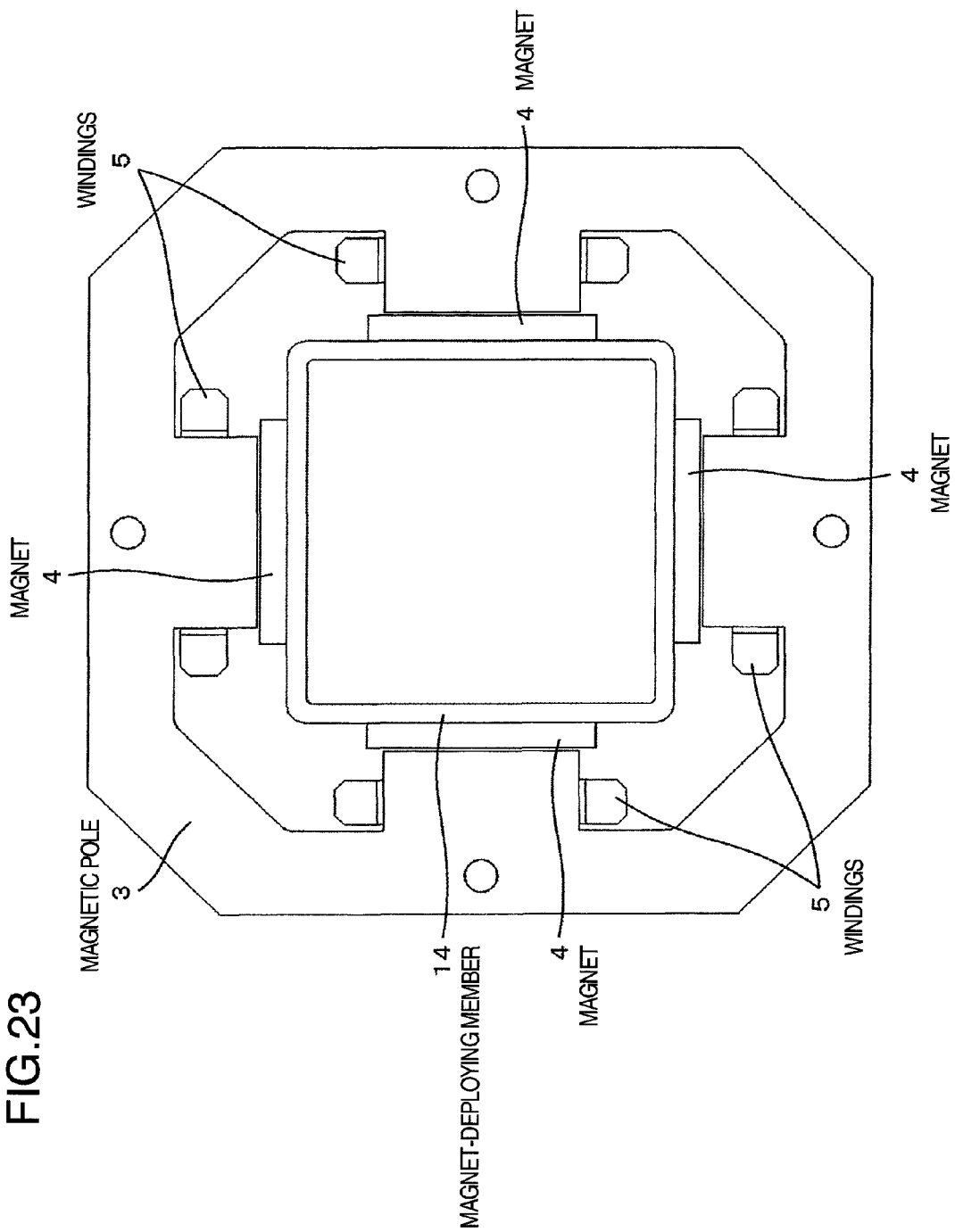
FIG. 23 illustrates a diagram of the linear motor in FIG. 22 from the travelling direction.
Figure 24:
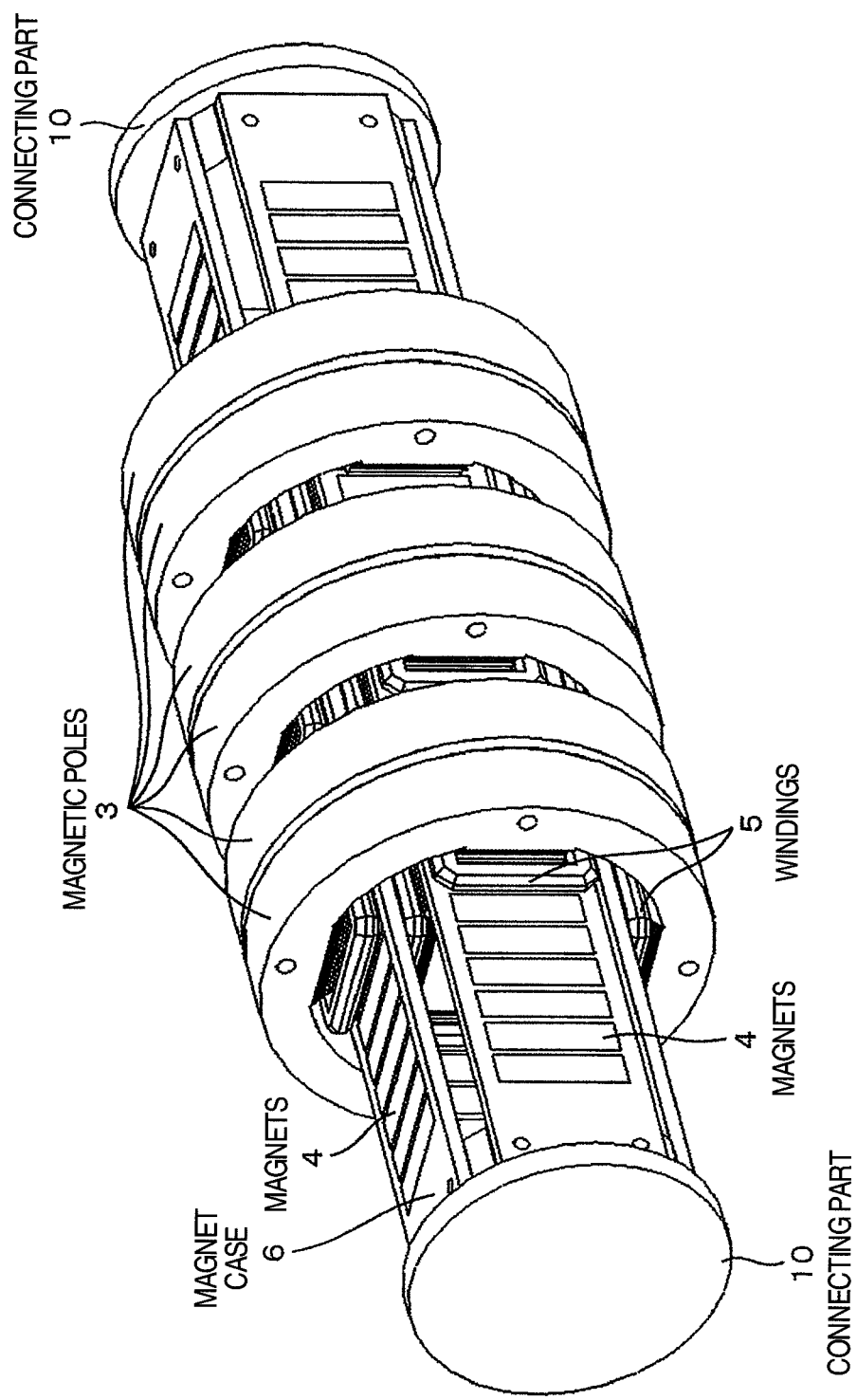
FIG. 24 illustrates a modified embodiment of the linear motor in FIG. 16.
Figure 25:
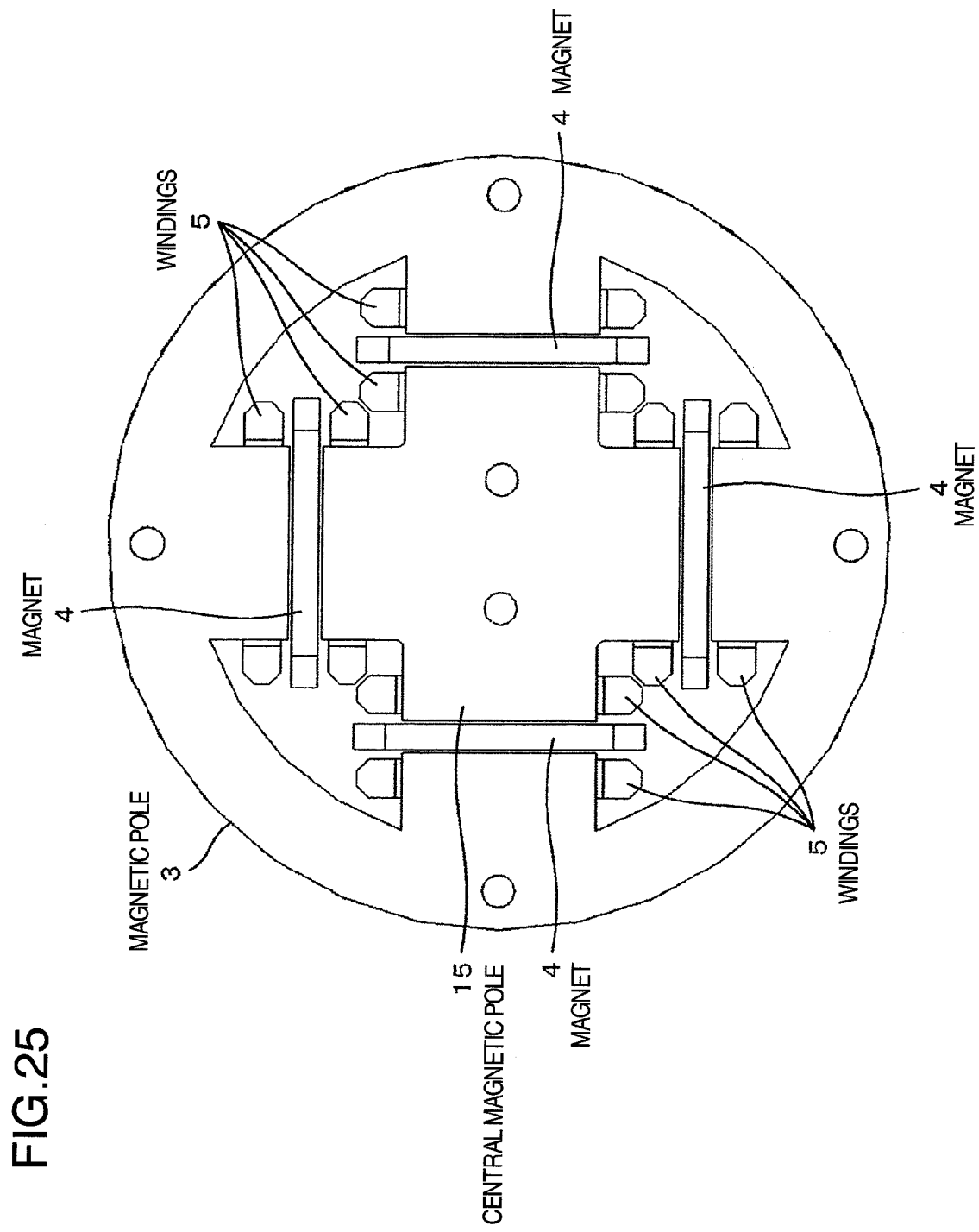
FIG. 25 illustrates a diagram of the linear motor in FIG. 24 from the travelling direction.

FIG. 22 illustrates the armature where the light-weight implementation of the displaceable portion is accomplished by forming the member for fixing the magnets 4 into an angular cylinder. FIG. 23 illustrates a diagram of the armature in FIG. 22 when seen from the travelling direction of the magnet arrays. The magnets 4 are deployed on the four surfaces of the angular cylinder. Moreover, the magnetic pole 3 is configured on the outer side of the magnets 4, then deploying the windings 5 on each of the portions of the magnetic pole 3 opposed to the magnets 4. FIG. 24 illustrates a modified embodiment where the outer circumference of the linear motor illustrated in FIG. 16 is formed into an arc-profiled outer circumference. FIG. 25 illustrates a diagram of the linear motor in FIG. 24 when seen from the travelling direction of the magnet arrays. As is the case with FIG. 17, the magnetic pole 3 is so deployed as to be opposed to the individual magnets 4. In the central portion, the cross-character-profiled central magnetic pole 15 is so deployed as to be brought into contact with the four units of magnets 4. The windings 5 are wound around the magnetic pole 3 on each magnet-opposed-portion basis. In this way, it is possible to change the profile of the linear motor in harmony with a space into which the linear motor is to be deployed.

7th Embodiment

Figure 26:
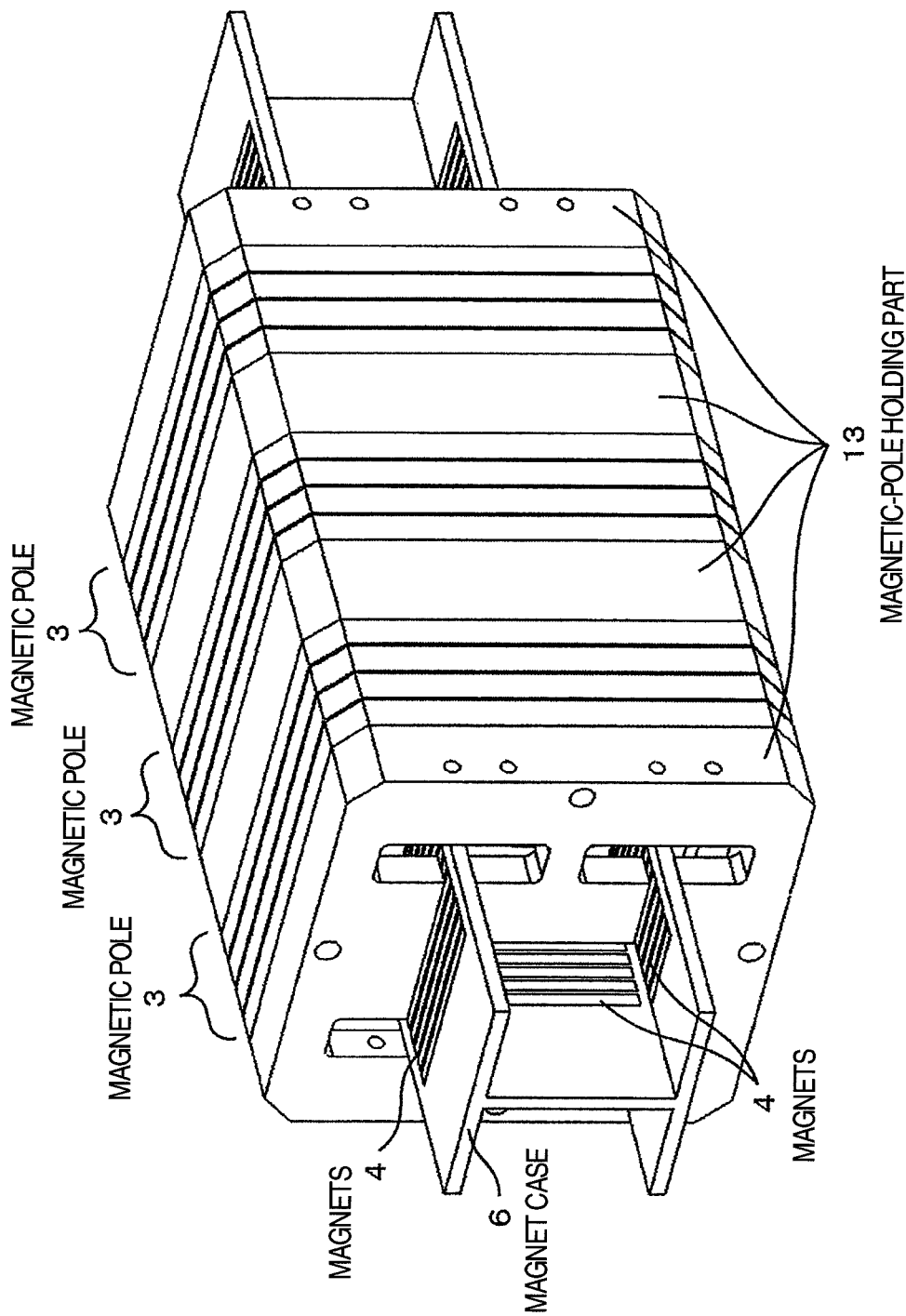
FIG. 26 illustrates a seventh embodiment of the linear motor of the present invention.
Figure 27:
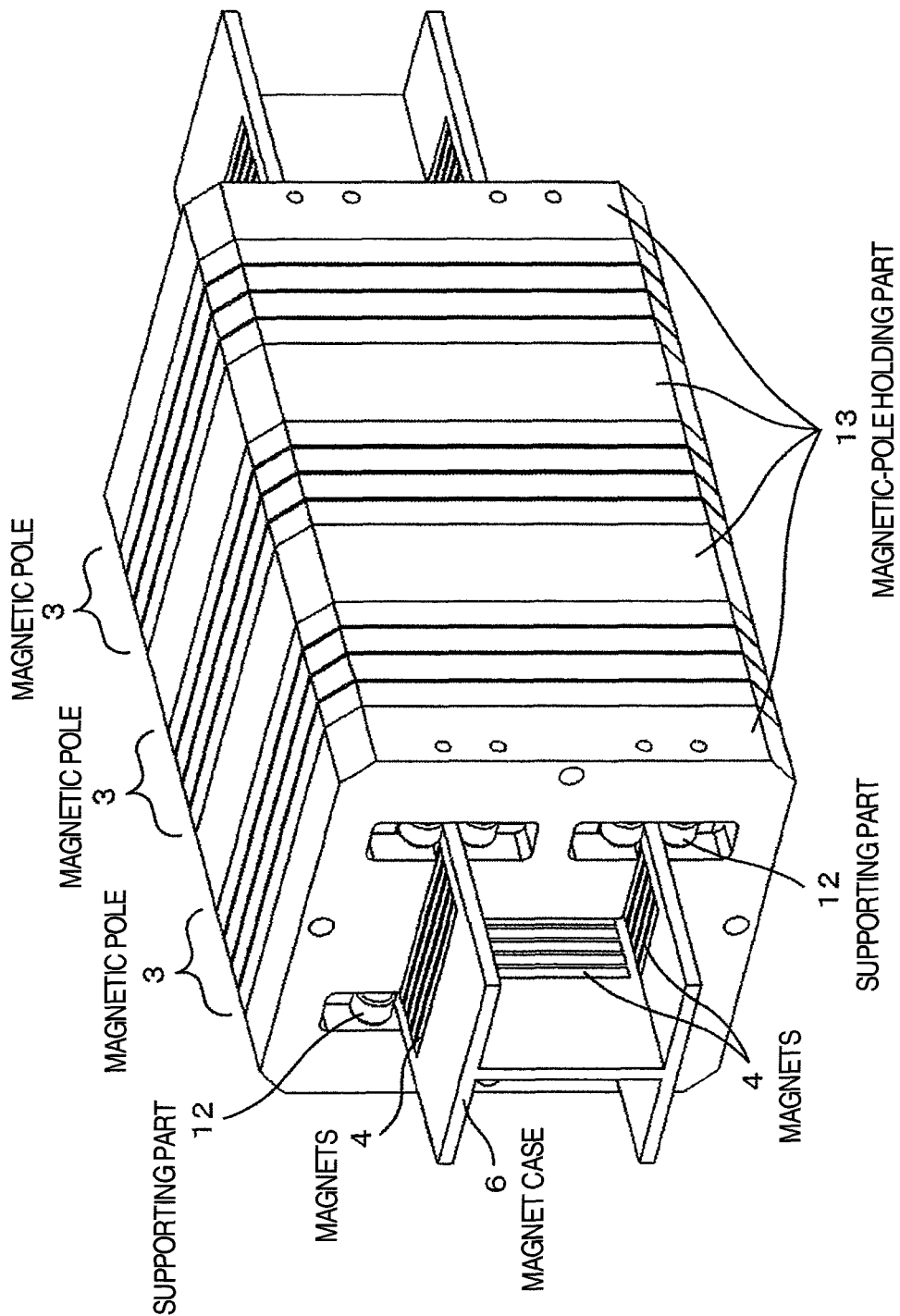
FIG. 27 illustrates the detailed configuration of the seventh embodiment of the linear motor.
Figure 28:
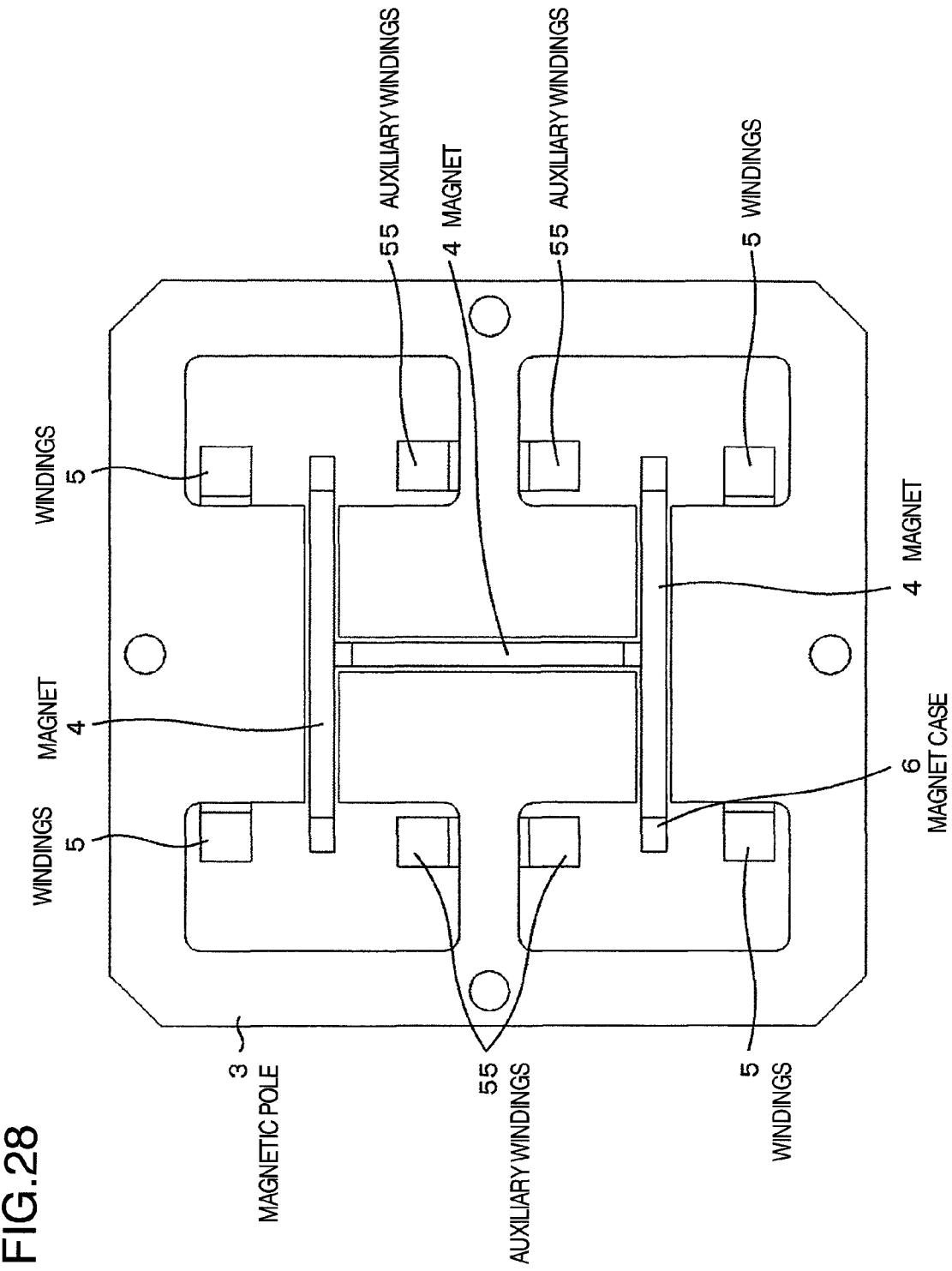
FIG. 28 illustrates a diagram of the linear motor in FIG. 26 from the travelling direction.
Figure 29:
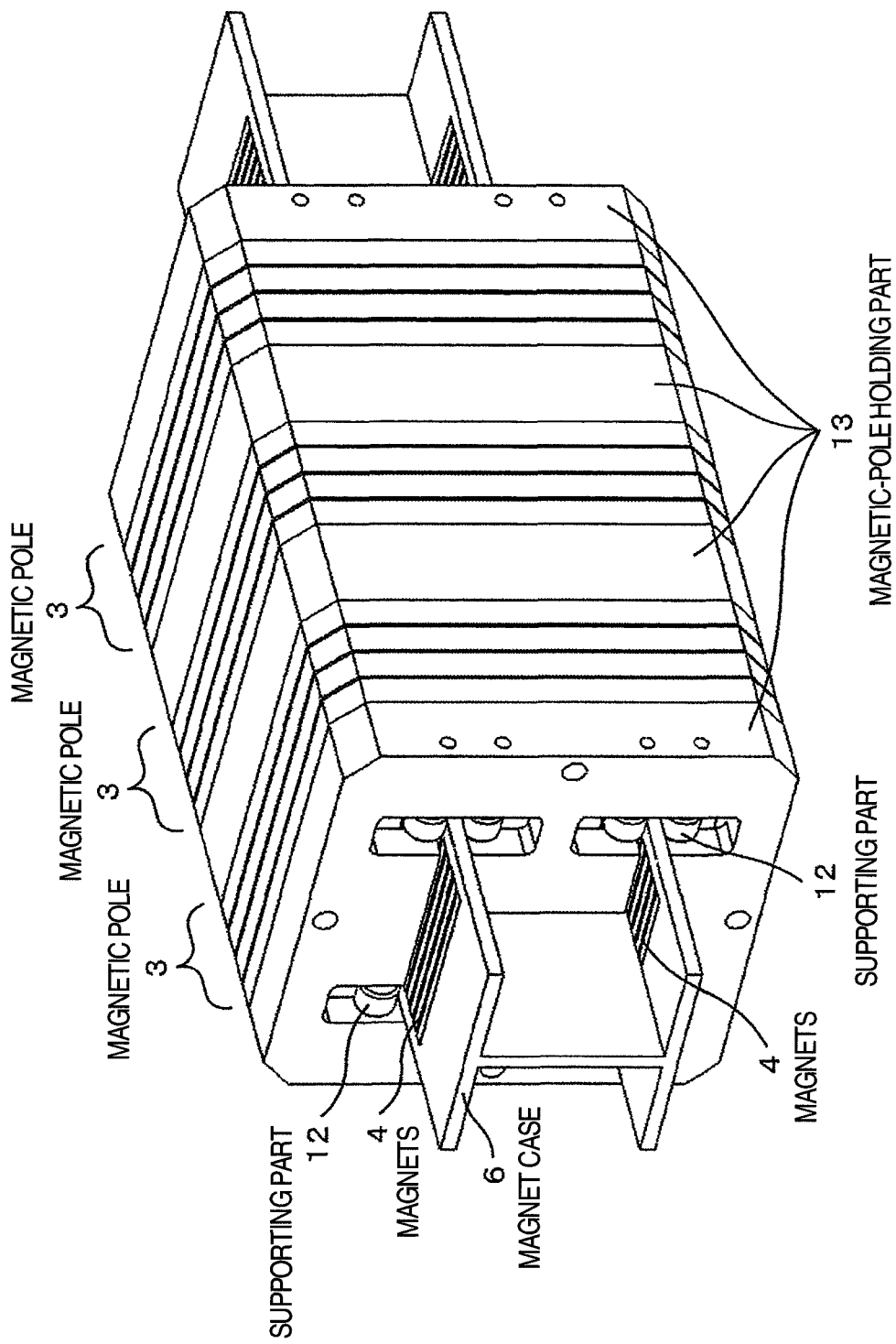
FIG. 29 illustrates a modified embodiment of the linear motor in FIG. 27.
Figure 30:
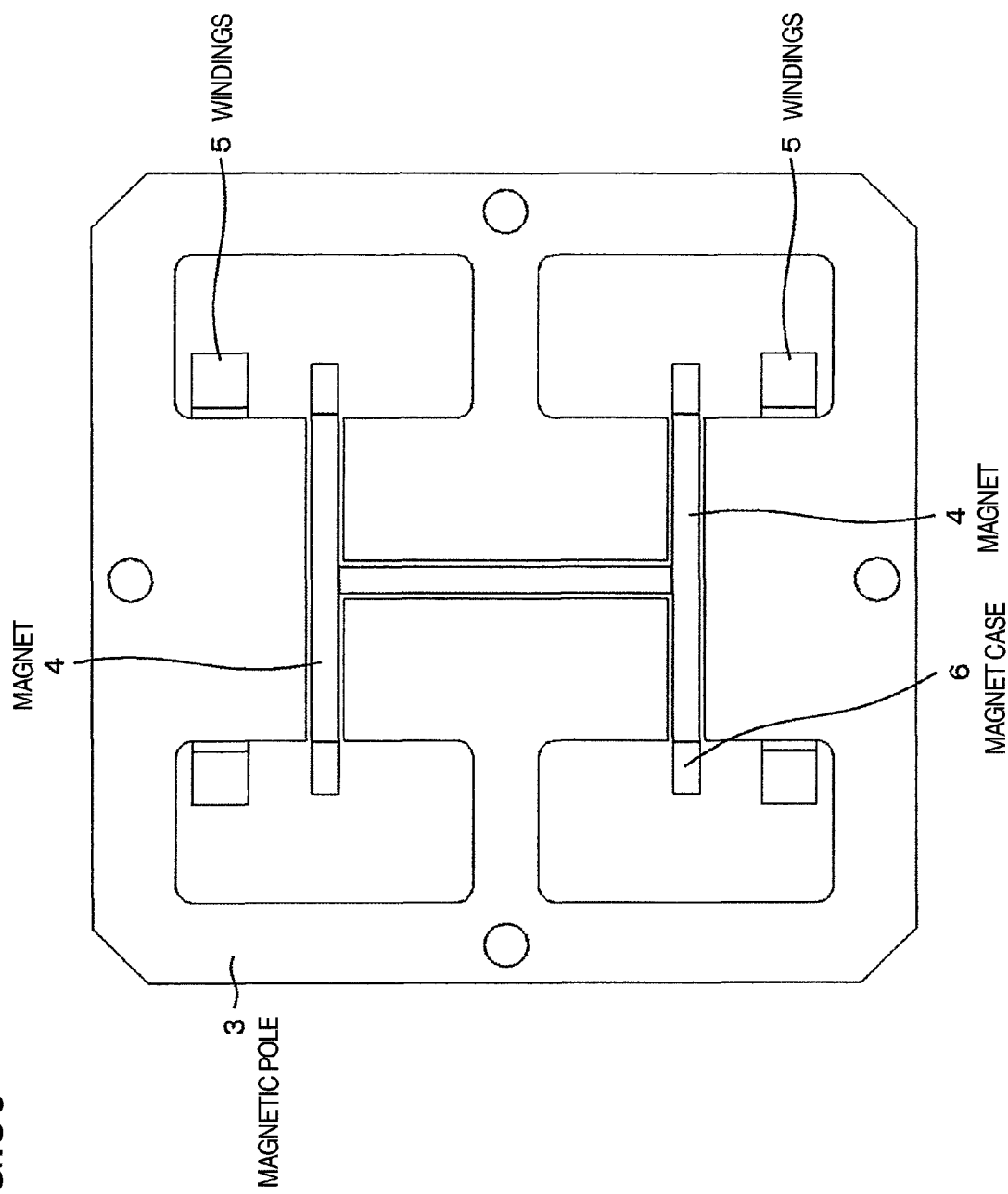
FIG. 30 illustrates a diagram of the linear motor in FIG. 29 from the travelling direction.

FIG. 26 illustrates a seventh embodiment of the linear motor of the present invention. In the present embodiment, the rigidity of the magnet case 6 is enhanced by forming the profile of the magnet case 6 into an I-character profile. Deploying the magnets 4 on the vertical portion of the I character as well makes it possible to implement an increase in the thrust, and to the make the position adjustment of the magnet case 6 in the transverse direction. FIG. 27 illustrates a configuration example where the supporting parts 12 are fixed onto the magnetic-pole holding parts 13 illustrated in FIG. 26. The implementation of a configuration like this stabilizes the position of the magnet case 6, thereby making the magnet case 6 resistant to undesirable factors such as an outer disturbance at the time of the driving. FIG. 28 illustrates a diagram of the linear motor in FIG. 26 when seen from the travelling direction of the magnet arrays. The windings 5 are deployed on the portions of the I character opposed to the upper-side and lower-side magnets 4. Moreover, auxiliary windings 55 are also deployed on the portions of the magnetic pole 3 in the central portion. It is possible to control the auxiliary windings 55 and the windings 5 simultaneously. Also, controlling only the auxiliary windings 55 independently makes it possible to acquire the effects of implementing the power adjustment in the transverse direction, and the increase in the thrust. FIG. 29 illustrates a diagram where the magnets of the vertical portion of the magnet case are formed into a plate-like material. FIG. 30 illustrates a diagram of the linear motor in FIG. 29 when seen from the travelling direction of the magnet arrays. Also, the I-character-profiled magnet case 6 can be divided into the two portions, i.e., the upper-side and lower-side plate-like portions, or can be divided into the three portions, i.e., the upper-side and lower-side plate-like portions and the vertical portion.

The linear motor of the present invention is available as a general-industry-dedicated thrust-generating mechanism.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A linear motor having an armature and a displacer, wherein
   said armature includes a plurality of magnetic poles and a plurality of windings, said displacer includes a plurality of permanent magnets, said armature and said displacer being relatively displaceable to each other,
   said magnetic poles further comprises:
   a plurality of magnetic-pole teeth which are oppositely-deployed on both sides of said permanent magnets with clearances placed therebetween; and
   a plurality of cores for connecting said magnetic-pole teeth to each other, said magnetic-pole teeth being oppositely-deployed with said clearances placed therebetween, wherein
   said plurality of magnetic poles are provided in a travelling direction of said displacer, and
   magnetic fluxes generated by said windings deployed on said armature have one and the same polarity in said plurality of magnetic poles,
   said plurality of oppositely-deployed magnetic-pole teeth being constituted in a stand-alone manner,
   distance between said magnetic-pole teeth being variable for each of said oppositely-deployed magnetic-pole teeth.

2. A linear motor having an armature and a displacer, wherein
   said armature includes a plurality of magnetic poles and a plurality of windings, said displacer including a plurality of permanent magnets, said armature and said displacer being relatively displaceable to each other,
   said magnetic poles further comprises:
   a plurality of magnetic-pole teeth which are oppositely-deployed on both sides of said permanent magnets with clearances placed therebetween; and
   a plurality of cores for connecting said magnetic-pole teeth to each other, said magnetic-pole teeth being oppositely-deployed with said clearances placed therebetween; wherein
   said plurality of magnetic poles are provided in a travelling direction of said displacer, and
   magnetic fluxes generated by said windings deployed on said armature have one and the same polarity in said plurality of magnetic poles,
   said plurality of oppositely-deployed magnetic-pole teeth being constituted with members which are multilayered in said travelling direction of said displacer.

3. A linear motor having an armature and a displacer, wherein:
   said armature includes a plurality of magnetic poles and a plurality of windings, said displacer including a plurality of permanent magnets, said armature and said displacer being relatively displaceable to each other,
   said magnetic poles, further comprises:
   a plurality of magnetic-pole teeth which are oppositely-deployed on both sides of said permanent magnets with clearances placed therebetween; and
   a plurality of cores for connecting said magnetic-pole teeth to each other, said magnetic-pole teeth being oppositely-deployed with said clearances placed therebetween; wherein
   said plurality of magnetic poles are provided in a travelling direction of said displacer, and
   magnetic fluxes generated by said windings deployed on said armature have one and the same polarity in said plurality of magnetic poles,
   said magnetic-pole teeth being deployed such that, letting magnet pitch be P, spacing between said magnetic-pole teeth falls into a range of $(2nP \pm P/2)$ with reference to a magnetic-pole tooth which becomes criterion.

4. A linear motor having an armature and a displacer, wherein
   said armature includes a plurality of magnetic poles and one or a plurality of windings, said displacer including a plurality of permanent magnets, said armature and said displacer being relatively displaceable to each other,
   said magnetic poles, further comprises:
   a plurality of magnetic-pole teeth which are oppositely-deployed on both sides of said permanent magnets with clearances placed therebetween; and
   a plurality of cores for connecting said magnetic-pole teeth to each other, said magnetic-pole teeth being oppositely-deployed with said clearances placed therebetween; wherein
   said plurality of magnetic poles are provided in a travelling direction of said displacer, and
   magnetic fluxes generated by said one or plurality of windings deployed on said armature have one and the same polarity in said plurality of magnetic poles,
   distance between said magnetic-pole teeth being variable for each of said oppositely-deployed magnetic-pole teeth,
   said magnetic fluxes directed in one and the same direction being generated inside said clearances by said one or plurality of windings deployed on said armature.

5. The linear motor according to claim 1, wherein
   said plurality of armatures are deployed in parallel to said travelling direction of said displacer.

6. The linear motor according to claim 1, wherein said plurality of displacers are deployed.

7. The linear motor according to claim 6, wherein said plurality of displacers are connected to each other.

8. The linear motor according to claim 1, wherein
said plurality of magnetic-pole teeth which are oppositely-deployed to said magnets are provided in parallel to said travelling direction of said displacer,
said plurality of displacers being deployed inside said clearances of said respective magnetic-pole teeth, each of said displacers including said permanent magnets.

9. The linear motor according to claim 8, wherein
said plurality of displacers deployed inside said clearances of said plurality of magnetic-pole teeth are connected to each other.

10. The linear motor according to claim 1, wherein
a supporting mechanism for supporting said displacer is provided among said plurality of armatures.

\* \* \* \* \*